US006970179B1

(12) United States Patent
Trenary et al.

(10) Patent No.: US 6,970,179 B1

(45) Date of Patent: Nov. 29, 2005

(54) METHOD AND APPARATUS FOR THE SCALING UP OF DATA

(75) Inventors: Timothy James Trenary, Fort Collins, CO (US); Joan LaVerne Mitchell, Longmont, CO (US); Ian Richard Finlay, Uxbridge (CA); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,382

(22) Filed: May 12, 2000

(51) Int. Cl.[7] ............................ G09G 5/00; G06K 9/48

(52) U.S. Cl. ....................................... 345/671; 382/248

(58) Field of Search ......................... 345/127, 660–671, 345/698–699, 629; 382/298–300, 236, 250, 382/260, 239, 251, 169, 223, 264, 248, 232; 348/744, 578; 708/403, 650, 400, 402; 358/1.2; 704/260

(56) References Cited

U.S. PATENT DOCUMENTS

| | | | | |
|---|---|---|---|---|
| 4,394,693 A | | 7/1983 | Shirley | 358/1.2 |
| 5,107,345 A | | 4/1992 | Lee | 382/250 |
| 5,253,078 A | | 10/1993 | Balkanski et al. | 382/250 |
| 5,262,854 A | | 11/1993 | Ng | 375/240 |
| 5,321,522 A | | 6/1994 | Eschbach | 382/239 |
| 5,572,236 A | | 11/1996 | Feig et al. | 345/603 |
| 5,602,594 A | | 2/1997 | Cho et al. | 375/240 |
| 5,629,778 A | * | 5/1997 | Reuman | 382/252 |
| 5,708,732 A | | 1/1998 | Merhav et al. | |
| 5,712,809 A | | 1/1998 | Girod et al. | 708/402 |
| 5,724,453 A | | 3/1998 | Ratnakar et al. | 382/251 |
| 5,737,450 A | * | 4/1998 | Hajjahmad et al. | 382/260 |
| 5,740,284 A | | 4/1998 | Wober et al. | |
| 5,751,846 A | | 5/1998 | Higgins-Luthman et al. | 382/169 |
| 5,825,680 A | | 10/1998 | Wheeler et al. | 708/650 |
| 5,832,120 A | | 11/1998 | Prabhaker et al. | 382/233 |

(Continued)

OTHER PUBLICATIONS

Hu et al, Image/Video Spatial Scalability in Compressed Domain, Feb. 1, 1998, IEEE Transactions on Industrial Electronics, vol. 45, No. 1.*

(Continued)

*Primary Examiner*—Matthew C. Bella
*Assistant Examiner*—Anthony J Blackman
(74) *Attorney, Agent, or Firm*—David W. Victor; Konrad Raynes & Victor LLP

(57) ABSTRACT

A method, system, and data structure for the scaling up of data is provided. A block of transformed data samples is received wherein the transformed data samples represent original data samples. One of at least two tables of constants is selected wherein each table of constants is capable of increasing the number of data samples by a different factor. The constants taken from the selected table are applied to the block of transformed data samples to produce at least two blocks of transformed data samples representing at least two blocks of original data samples. The data is processed one dimension at a time by multiplying the data in one dimension with selected constants taken from previously developed tables corresponding to the desired scale up factor. Scaling up by different factors in each dimension as well as scaling down in one dimension and scaling up in the other dimension may be achieved. In addition, the de-quantization of the quantized transform coefficients may be accomplished by pre-multiplication of the scaling constants when the quantization values are known. In a similar way the re-quantization may be accomplished by a pre-divsion of the scaling constants. Both de-quantization and re-quantization may be combined when the input quantized transform coefficients and output quantized transform coefficients are desired.

23 Claims, 11 Drawing Sheets

U.S. PATENT DOCUMENTS

| | | | | |
|---|---|---|---|---|
| 5,832,135 | A | 11/1998 | Merhav et al. | 382/260 |
| 5,832,435 | A | 11/1998 | Silverman | 704/260 |
| 5,845,015 | A | 12/1998 | Martucci | 382/250 |
| 5,850,484 | A * | 12/1998 | Beretta et al. | 382/250 |
| 5,859,788 | A | 1/1999 | Hou | 708/400 |
| 5,872,874 | A | 2/1999 | Natarajan | 382/298 |
| 5,875,039 | A | 2/1999 | Ohsawa et al. | |
| 5,883,823 | A | 3/1999 | Ding | 708/402 |
| 5,886,743 | A | 3/1999 | Oh et al. | 375/240 |
| 5,933,542 | A | 8/1999 | Chang et al. | 382/264 |
| 6,308,193 | B1 * | 10/2001 | Jang et al. | 708/401 |
| 6,456,745 | B1 | 9/2002 | Bruton et al. | |

OTHER PUBLICATIONS

Feig, Finlay, and Mitchell, "Transform Domain Scaling for Non-Commensurable Ratios", IBM TDB vol. 38, No. 6, Jun. 1995.

U.S. Appl. No. 09/873,669, filed Jul. 12, 1997.

U.S. Appl. No. 09/186,245, filed Nov. 4, 1998.

U.S. Appl. No. 09/186,249, filed Nov. 4, 1998.

U.S. Appl. No. 09/186,247, filed Nov. 4, 1998.

U.S. Appl. No. 09/524,266, filed Mar. 12, 2000.

U.S. Appl. No. 09/524,389, filed Mar. 12, 2000.

U.S. Appl. No. 09/570,382, filed May 12, 2000.

U.S. Appl. No. 09/570,849, filed May 12, 2000.

Natarajah et al., "A Fast Approximate Algorithm for Scaling Down Digital Images in the DCT Domain." Proc. Int. Conf. On Image Processing, vol. 2, Oct. 23, 1995, pp. 241-243.

Merhav et al., "A Transform Domain Approach to Spatial Domain Image Scaling." Proc. IEEE Int. Conf. On Accoustics, Speech, and Signal Processing, vol. 4, May 7, 1996, pp. 2403-2406.

de Queiroz et al., "Fast Downscaled Inverses for Images Compressed with M-Channel Lapped Transforms." IEEE Trans. On Image Processing, vol. 6, No. 6, Jun. 1997,pp. 794-807.

* cited by examiner

| B \ A | 1 | 2 | 3 | 4 | 5 | 6 | 7 | 8 | 9 | 10 | 11 | 12 |
|---|---|---|---|---|---|---|---|---|---|---|---|---|
| 1 | . | 2 | 3 | 4 | 5 | 6 | 7 | 8 | 9 | 10 | 11 | 12 |
| 2 | 0.5 | . | 1.5 | . | 2.5 | . | 3.5 | . | 4.5 | . | 5.5 | . |
| 3 | 0.333 | 0.667 | . | 1.333 | 1.667 | . | 2.333 | 2.667 | . | 3.333 | 3.667 | . |
| 4 | 0.25 | . | 0.75 | . | 1.25 | . | 1.75 | . | 2.25 | . | 2.75 | . |
| 5 | 0.2 | 0.4 | 0.6 | 0.8 | . | 1.2 | 1.4 | 1.6 | 1.8 | . | 2.2 | 2.4 |
| 6 | 0.167 | . | . | . | 0.833 | . | 1.167 | . | . | . | 1.833 | . |
| 7 | 0.143 | 0.286 | 0.429 | 0.571 | 0.714 | 0.857 | . | 1.143 | 1.286 | 1.429 | 1.571 | 1.714 |
| 8 | 0.125 | . | 0.375 | . | 0.625 | . | 0.875 | . | 1.125 | . | 1.375 | . |
| 9 | 0.111 | 0.222 | . | 0.444 | 0.556 | . | 0.778 | 0.889 | . | 1.111 | 1.222 | . |
| 10 | 0.1 | . | 0.3 | . | . | . | 0.7 | . | 0.9 | . | 1.1 | . |
| 11 | 0.091 | 0.182 | 0.273 | 0.364 | 0.455 | 0.545 | 0.636 | 0.727 | 0.818 | 0.909 | . | 1.091 |
| 12 | 0.083 | . | . | . | 0.417 | . | 0.583 | . | . | . | 0.917 | |

FIG. 11

METHOD AND APPARATUS FOR THE SCALING UP OF DATA

CROSS REFERENCE TO RELATED APPLICATIONS

The present application is related to the following U.S. patent applications: Ser. No. 09/186,245 filed Nov. 4, 1998, by Joan L. Mitchell and Martin J. Bright for "Transform-Domain Correction of Real Domain Errors"; Ser. No. 09/186,249 filed Nov. 4, 1998 by Martin J. Bright and Joan L. Mitchell for "Error Reduction in Transformed Digital Data"; Ser. No. 09/186,247 filed Nov. 4, 1998 by Martin J. Bright and Joan L. Mitchell for "Reduced-error Processing of Transformed Digital Data"; Ser. No. 09/524,266, filed Mar. 12, 2000, by Charles A. Micchelli, Marco Martens, Timothy J. Trenary and Joan L. Mitchell for "Shift and/or Merge of Transformed Data Along One Axis"; Ser. No. 09/524,389, filed Mar. 12, 2000, by Timothy J. Trenary, Joan L. Mitchell, Charles A. Micchelli, and Marco Martens for "Shift and/or Merge of Transformed Data Along Two Axes"; and Ser. No. 09/570,849, filed May 12, 2000, by Joan L. Mitchell, Timothy J. Trenary, Nenad Rijavec, and Ian R. Finlay, for "Method and Apparatus For The Scaling Down of Data", all assigned to a common assignee with this application and the disclosures of which are incorporated herein by reference.

BACKGROUND OF THE INVENTION

1. Field of the Invention

This invention relates to a method and apparatus for efficiently scaling up data which has been transformed from the real domain.

2. Description of the Related Art

Many types of data, such as radar data, oil well log data and digital image data, can consume a large amount of computer storage space. For example, computerized digital image files can require in excess of 1 MB. Therefore, several formats have been developed which manipulate the data in order to compress it. The discrete cosine transform (DCT) is a known technique for data compression and underlies a number of compression standards.

The mathematical function for a DCT in one dimension is:

$$\tilde{s}(k) = c(k)\sum_{n=0}^{N-1} s(n)\cos\frac{\pi(2n+1)k}{2N},$$

(1) where s is the array of N original values, $\tilde{s}$ is the array of N transformed values and the coefficients c are given by $$c(k) = \sqrt{\frac{1}{N}} \quad \text{for } k = 0; \quad c(k) = \sqrt{\frac{2}{N}} \quad \text{for } k > 0$$

Taking for example the manipulation of image data, blocks of data consisting of 8 rows by 8 columns of data samples frequently are operated upon during image resizing processes. Therefore a two-dimensional DCT calculation is necessary. The equation for a two-dimensional DCT where N=8 is:

$$\tilde{s}(i, j) = c(i, j)\sum_{n=0}^{7}\sum_{m=0}^{7} s(m, n)\cos\frac{\pi(2m+1)i}{16}\cos\frac{\pi(2n+1)j}{16},$$

where s is an 8×8 matrix of 64 values; $\tilde{s}$ is an 8×8 matrix of 64 coefficients and the cons tan ts c(i, j) are given by $$c(i, j) = \frac{1}{8}, \text{ when } i = 0 \text{ and } j = 0; \; c(i, j) = \frac{1}{4\sqrt{2}} \text{ if } i = 0 \text{ and } j > 0 \text{ or } i > 0 \text{ and } j = 0; \; c(i, j) = \frac{1}{4} \text{ when } i, j > 0$$

if i=0 and j>0 or i>0 and j=0; c(i, j)=¼ when i, j>0

Because data is taken from the "real" or spatial image domain and transformed into the DCT domain by equations (1) and (2), these DCT operations are referred to as forward Discrete Cosine Transforms (FDCT), or forward transform operations.

As previously mentioned, the DCT is an image compression technique which underlies a number of compression standards. These include the well-known Joint Photographic Experts Group (JPEG) and the Moving Picture Experts Group (MPEG) standards. Comprehensive references on the JPEG and MPEG standards include *JPEG Still Image Data Compression Standard* by William B. Pennebaker and Joan L. Mitchell (© 1993 Van Nostrand Reinhold), and MPEG Video Compression Standard by Joan L. Mitchell, William B. Pennebaker, et al (© 1997 Chapman & Hall).

Looking at the JPEG method, for example, there are five basic steps. Again taking the example of the manipulation of image data, the first step is to extract an 8×8 pixel block from the image. The second step is to calculate the FDCT for each block. Third, a quantizer rounds off the DCT coefficients according to the specified image quality. Fourth, the quantized, two-dimensional 8×8 block of DCT coefficients are reordered into a one-dimensional vector according to a zig zag scan order. Fifth, the coefficients are compressed using an entropy encoding scheme such as Huffman coding or arithmetic coding. The final compressed data is then written to the output file.

Returning to the first step, source image samples are grouped into 8×8 data matrices, or blocks. The initial image data is frequently converted from normal RGB color space to a luminance/chrominance color space, such as YUV. YUV is a color space scheme that stores information about an image's luminance (brightness) and chrominance (hue). Because the human eye is more sensitive to luminance than chrominance, more information about an image's chrominance can be discarded as compared to luminance data.

Once an 8×8 data block has been extracted from the original image and is in the desired color scheme, the DCT coefficients are computed. The 8×8 matrix is entered into the DCT algorithm, and transformed into 64 unique, two-dimensional spatial frequencies thereby determining the input block's spectrum.

The ultimate goal of this FDCT step is to represent the image data in a different domain using the cosine functions. This can be advantageous because it is a characteristic of cosine functions that most of the spatial frequencies will disappear for images in which the image data changes slightly as a function of space. The image blocks are transformed into numerous curves of different frequencies. Later, when these curves are put back together through an inverse step, a close approximation to the original block is restored.

After the FDCT step, the 8×8 matrix contains transformed data comprised of 64 DCT coefficients in which the first coefficient, commonly referred to as the DC coefficient, is related to the average of the original 64 values in the block. The other coefficients are commonly referred to as AC coefficients.

Up to this point in the JPEG compression process, little actual image compression has occurred. The 8×8 pixel block has simply been converted into an 8×8 matrix of DCT coefficients. The third step involves preparing the matrix for further compression by quantizing each element in the matrix. The JPEG standard gives two exemplary tables of quantization constants, one for luminance and one for chrominance. These constants were derived from experiments on the human visual system. The 64 values used in the quantization matrix are stored in the JPEG compressed data as part of the header, making dequantization of the coefficients possible. The encoder needs to use the same constants to quantize the DCT coefficients.

Each DCT coefficient is divided by its corresponding constant in the quantization table and rounded off to the nearest integer. The result of quantizing the DCT coefficients is that smaller, unimportant coefficients will disappear and larger coefficients will lose unnecessary precision. As a result of this quantization step, some of the original image quality is lost. However, the actual image data lost is often not visible to the human eye at normal magnification.

Quantizing produces a list of streamlined DCT coefficients that can now be very efficiently compressed using either a Huffman or arithmetic encoding scheme. Thus the final step in the JPEG compression algorithm is to encode the data using an entropy encoding scheme. Before the matrix is encoded, it is arranged in a one-dimensional vector in a zigzag order. The coefficients representing low frequencies are moved to the beginning of the vector and the coefficients representing higher frequencies are placed towards the end of the vector. By placing the higher frequencies (which are more likely to be zeros) at the end of the vector, an end of block code truncates the larger sequence of zeros which permits better overall compression.

Equations (1) and (2) describe the process for performing a FDCT, i.e., taking the data from the real domain into the DCT domain. When it is necessary to reverse this step, i.e., transform the data from the DCT domain to the real domain, a DCT operation known as an Inverse Discrete Cosine Transform (IDCT), or an inverse transform operation, can be performed. For a one-dimensional, inverse transform operation, the IDCT is defined as follows:

$$s(n) = \sum_{k=0}^{N-1} c(k)\tilde{s}(k)\cos\frac{\pi(2\pi+1)k}{2N},$$

where s is the array of N original values, s̃ is the array of N transformed values and the coefficients c are given by $$c(k) = \sqrt{\frac{1}{N}} \quad \text{for } k=0;\ c(k) = \sqrt{\frac{2}{N}} \quad \text{for } k>0$$

For an inverse transform operation in two dimensions where N=8, the IDCT is defined:

$$s(m, n) = \sum_{i=0}^{7}\sum_{j=0}^{7} c(i, j)\tilde{s}(i, j)\cos\frac{\pi(2m+1)i}{16}\cos\frac{\pi(2n+1)j}{16}, \tag{4}$$

where s is an 8×8 matrix of 64 values, s̃ is an 8×8 matrix of 64 coefficients and the cons tan ts c(i, j) are given by $$c(i, j) = \frac{1}{8} \text{ when } i=0 \text{ and } j=0;\ c(i, j) = \frac{1}{4\sqrt{2}} \text{ if } i=0 \text{ and } j>0 \text{ or } i>0 \text{ and } j=0;\ c(i, j) = \frac{1}{4} \text{ when } i, j>0$$

if i=0 and j>0 or i>0 and j=0; c(i, j)=¼ when i, j>0

As previously stated, digital images are often transmitted and stored in compressed data formats, such as the previously described JPEG standard. In this context, there often arises the need to scale up (i.e., enlarge) the dimensions of an image that is provided in a compressed data format in order to achieve a suitable image size.

For example, where an image is to be sent in compressed data format to receivers of different computational and output capabilities, it may be necessary to scale up the size of the image to match the capabilities of each receiver. For example, some printers are designed to receive images which are of a certain size, but the printers must have the capability of scaling up the image size for printing purposes, particularly when the original image was intended for low resolution display output.

A known method for scaling up an image provided in a transformed data format is illustrated in FIG. 1. First, a determination is made as to the amount of desired image enlargement B. (Block 10) Next, one 8×8 block of transformed data is retrieved and an IDCT is performed on all 64 coefficients in the block to transform the data into the real or spatial domain. (Blocks 11 & 12)

Once in the real domain, additional real domain pixel or pel values are created by known methods, such as interpolation. (Block 13) This results in the creation of B adjacent data blocks of 64 pixel or pel values per block in each dimension. If, for example, a scale up factor of two (2) was desired, then this step would result in the creation of 2 data blocks in each dimension for a total of four (4) blocks. Then a FDCT operation is performed on the data of the four adjacent 8×8 blocks to return the data to the DCT domain. (Block 14) The process is repeated for all remaining data in the input image. (Block 15)

Thus given a portion of an image in a JPEG/DCT compressed data format consisting of one compressed 8×8 block of image data, scaling up the image by a factor of two in each dimension using a previously known method requires: (1) entropy decoding the data which is in one-dimensional vector format and placing the data in 8×8 blocks; (2) de-quantizing the data; (3) performing 8×8 IDCT operations to inverse transform the transformed blocks of image data; (4) additional interpolation or related operations to scale up the blocks of image data into four 8×8 blocks of scaled image data; (5) four 8×8 FDCT operations to re-transform the four blocks of scaled image data; (6) quantizing the four 8×8 blocks of data; and (7) placing the four blocks of data in one-dimensional vectors and entropy encoding the data for storage or transmission. Given the mathematical complexity of the FDCT and IDCT operations, such a large number of operations is computationally time consuming.

What is needed is an efficient method and apparatus that operates directly upon transformed blocks of image data to convert them into transformed blocks of scaled-up image data.

SUMMARY OF THE PREFERRED EMBODIMENTS

To overcome the limitations in the prior art described above, preferred embodiments disclose a method, system, and data structure for the scaling up of data. A block of transformed data samples is received. The block of transformed data samples represents a block of original data samples. One of at least two tables of constants is selected wherein each table of constants is capable of increasing the number of transformed data samples by a different factor. The constants taken from the selected table are applied to the block of transformed data samples to produce at least two blocks of transformed data samples representing at least two blocks of final data samples.

In another embodiment, a method for generating a plurality of constants for use in increasing the number of original data samples by a factor of B is provided. A plurality of original variables representing data samples is expressed as a second plurality of variables representing a scaled number of data samples with a scaling factor of B. B representations of B sets of new variables are expressed as the second plurality of variables. Transform operations are applied on the B sets of new variables and the plurality of original variables to obtain a transformation from transform coefficients of the plurality of original variables into transform coefficients of the B sets of new variables. This, in turn, yields the plurality of constants.

BRIEF DESCRIPTION OF THE DRAWINGS

FIG. 11 is a table of values for the selection of tables of constants for the scaling up or scaling down of data by integer and non-integer amounts.

DETAILED DESCRIPTION OF THE PREFERRED EMBODIMENTS

In the following description, reference is made to the accompanying drawings which form a part hereof and which illustrate several embodiments of the present invention. It is understood that other embodiments may be used and structural and operational changes may be made without departing from the scope of the present invention.

For purposes of illustrating the invention, the well-known JPEG and MPEG DCT transform operation of images is being used. However, the same techniques can be used to compress any two-dimensional array of data. DCT transform operations work best when the data contains some internal correlation that the FDCT can then de-correlate.

Computing Environment

Figure 1:
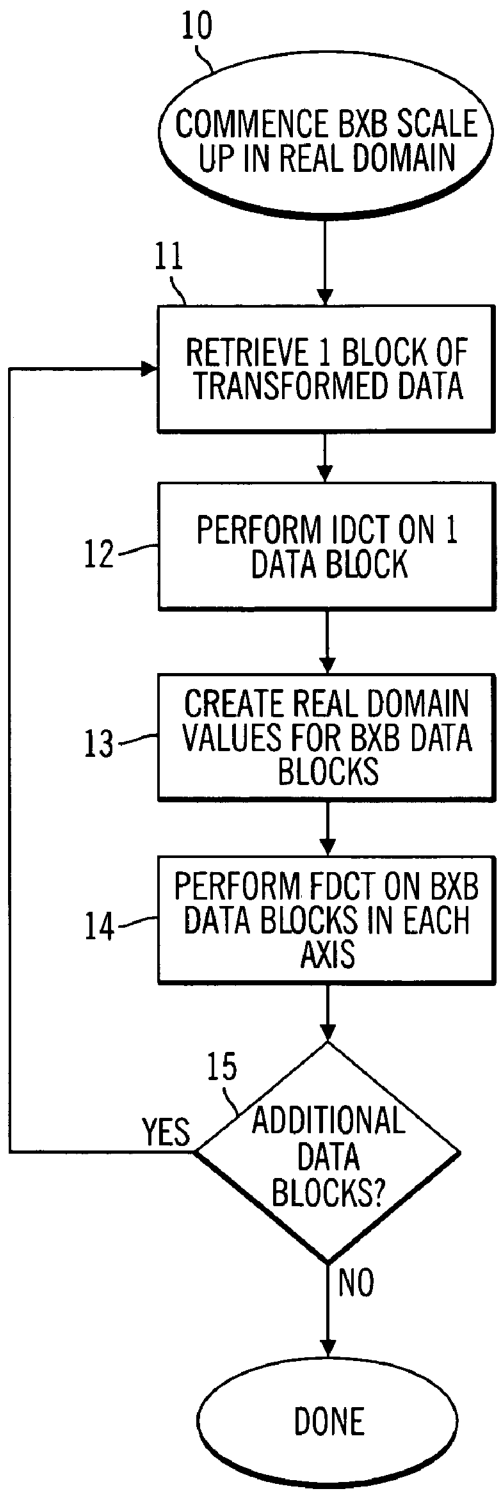
FIG. 1 illustrates the logic for a known method of scaling up the size of an input image which is received in transformed format.
Figure 2:
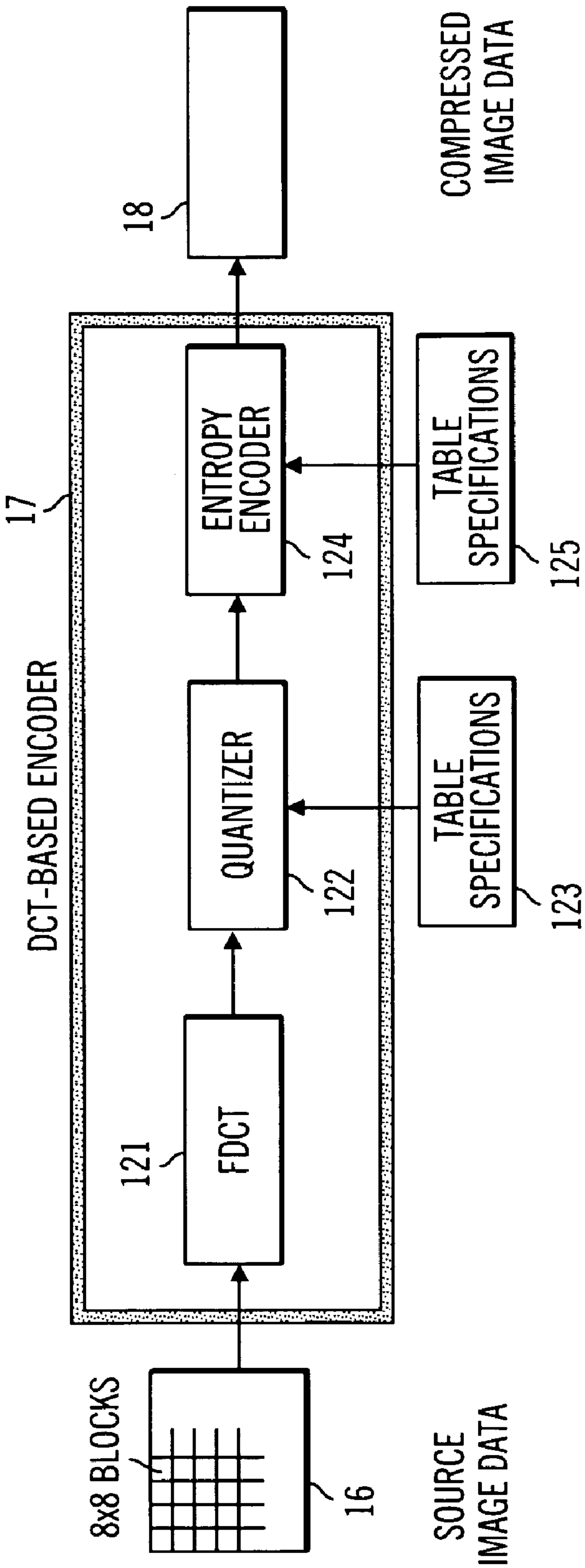
FIG. 2 is a simplified block diagram of a DCT-based JPEG encoder.

Referring now to the drawings, and more particularly to FIG. 2, there is shown a simplified block diagram of a DCT-based encoder. A source image sampled data 16 in 8×8 blocks are input to the encoder 17. Each 8×8 data block is transformed by the Forward Discrete Cosine Transform (FDCT) 121 into a set of 64 values, referred to as DCT coefficients or transformed data samples. One of these values is referred to as the DC coefficient, and the other 63 values are referred to as AC coefficients. Each of the 64 transformed data samples are then quantized by quantizer 122 using one of 64 corresponding input quantization values from a quantization table 123. The quantized transformed data samples are then passed to an entropy encoding procedure 124 using table specifications 125. This procedure compresses the data further. One of two entropy encoding procedures can be used, Huffman encoding or arithmetic encoding. If Huffman encoding is used, the Huffman table specifications must be provided, but if arithmetic encoding is used, then arithmetic coding conditioning table specifications must be provided. The previous quantized DC coefficient is used to predict the current DC coefficient and the difference is encoded. The 63 AC coefficients, however, are not differentially encoded but, rather, are converted into a zig-zag sequence. The output of the entropy encoder is the compressed image data 18.

Figure 3:
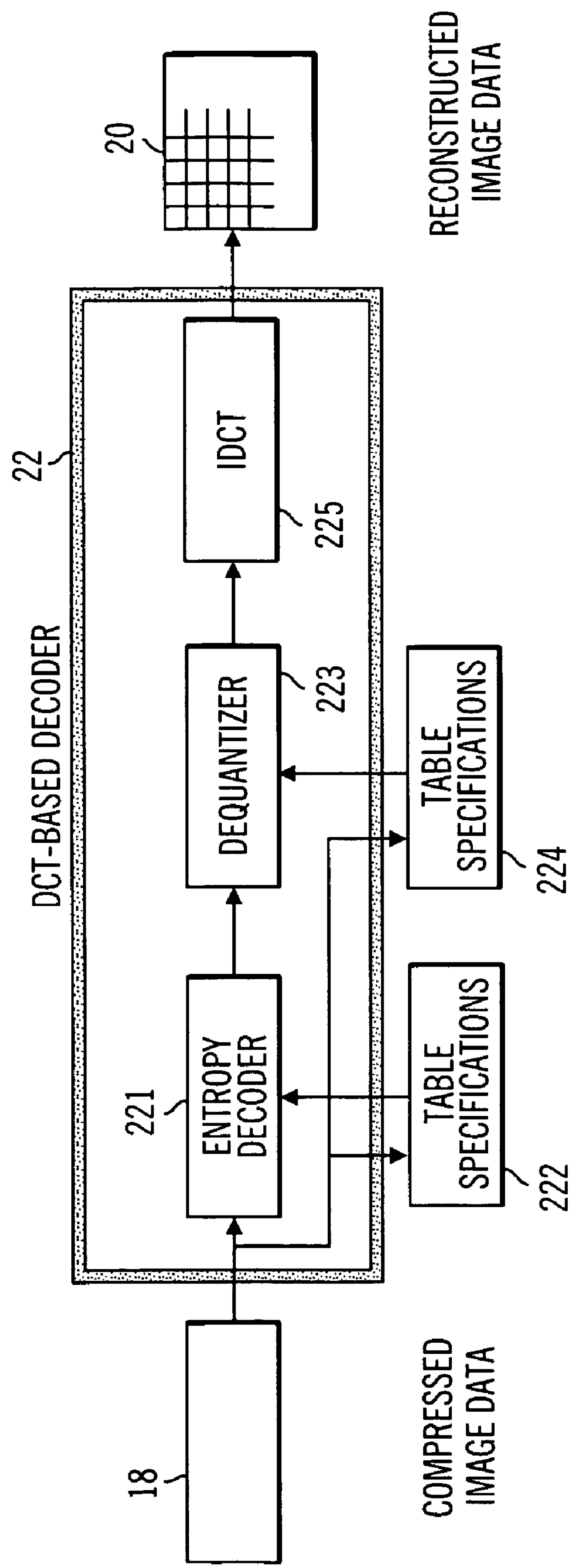
FIG. 3 is a simplified block diagram of a DCT-based JPEG decoder.

FIG. 3 shows a simplified block diagram of the DCT-based decoder. Each step shown performs essentially the inverse of its corresponding main procedure within the encoder shown in FIG. 2. The compressed image data 18 is input to the decoder 22 where it is first processed by an entropy decoder procedure 221 which decodes the zig-zag sequence of the quantized DCT coefficients. This is done using either Huffman table specifications or arithmetic coding conditioning table specifications 222, depending on the coding used in the encoder. The quantized DCT coefficients (or quantized transformed data samples) output from the entropy decoder are input to the dequantizer 223 which, using quantization table specifications 224 comprising output quantization values, outputs dequantized DCT coefficients to Inverse Discrete Cosine Transform (IDCT) 225. The output of the IDCT 225 is the reconstructed image 20.

Figure 4:
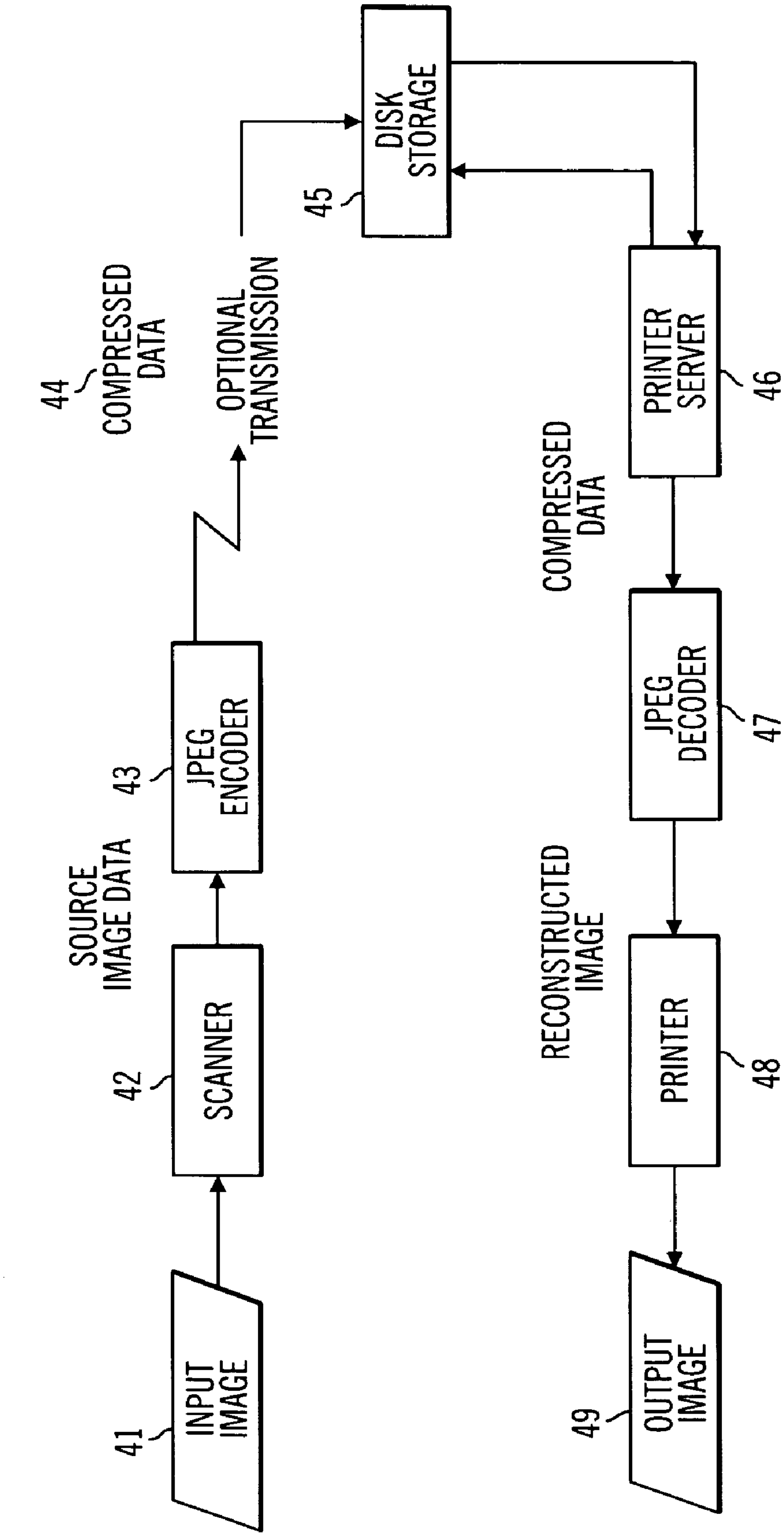
FIG. 4 is a block diagram of a simple printing system that uses JPEG compressed images.

FIG. 4 shows a block diagram of a simple printing system that uses JPEG compressed images. For this illustration, the input image is assumed to be a grayscale image comprised of samples from only one component and the printer, a grayscale printer. The input image 41 is scanned in the scanner 42 and then the source image data, a single component of gray, is compressed with a JPEG encoder 43, such as described with reference to FIG. 2. The JPEG encoder 43 is shown separately from the scanner 42, but in a practical embodiment, the JPEG encoder 43 could be incorporated with the scanner 42. The output of the JPEG encoder 43 is compressed data 44. After optional transmission, the compressed data is stored on a disk storage device 45. At some later time, the compressed data stored on the disk storage device 45 is retrieved by the printer server 46 which scales the image in the transformed domain. The scaled image is recompressed in the printer server 46 so that the JPEG decoder 47 decodes the reconstructed scaled-up image. The JPEG decoder 47 is as described with reference to FIG. 3. The printer 48 prints the grayscale scaled image and produces the output image 49 on paper.

Enlargement of Image Size

The preferred embodiments of the present invention include a method, system and data structure for efficiently scaling up data which is received in a transformed or a DCT-based data format. A one-dimensional DCT-domain enlargement method is disclosed that scales up one block of data along one dimension into B blocks where B is the enlargement factor for the entire set of data along one axis.

Figure 5:
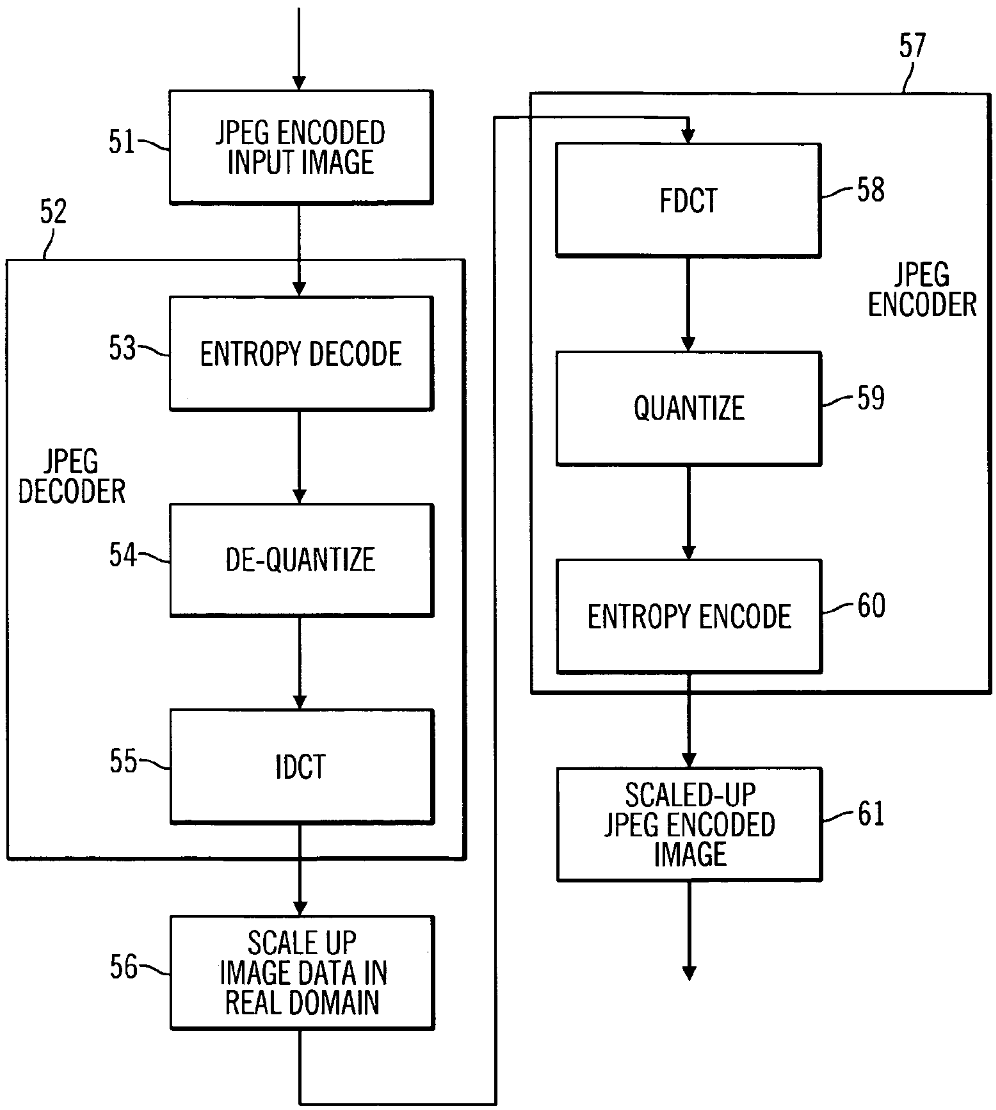
FIG. 5 is a simplified block diagram showing the scaling up of the size of an input image.

FIG. 5 shows a known, traditional method for the enlargement of images. The compressed image 51 is JPEG decoded by JPEG decoder 52. The decoder 52 first entropy decodes 53 the data which arrives in one-dimensional vector format and places the data in two-dimensional block format. Next the data is taken through a de-quantizing step 54. Finally, an IDCT operation 55 is performed to inverse transform the transformed blocks of image data to the real domain.

When in the real domain, the image data is manipulated 56 by additional interpolation or related operations to scale up the blocks of image data into blocks of scaled image data.

The scaled data is sent to the JPEG encoder 57 where the process is reversed. First, FDCT operations 58 are performed to re-transform the blocks of scaled image data from the real domain to the DCT domain. The transformed data is then quantized 59, placed in a one-dimensional vector and entropy encoded 60 for storage or transmission as a JPEG encoded image of scaled up dimensions 61. Thus it is seen that the known, scale up method of FIG. 5 involves performing scale up operations on data which is in the real domain.

Figure 6A:
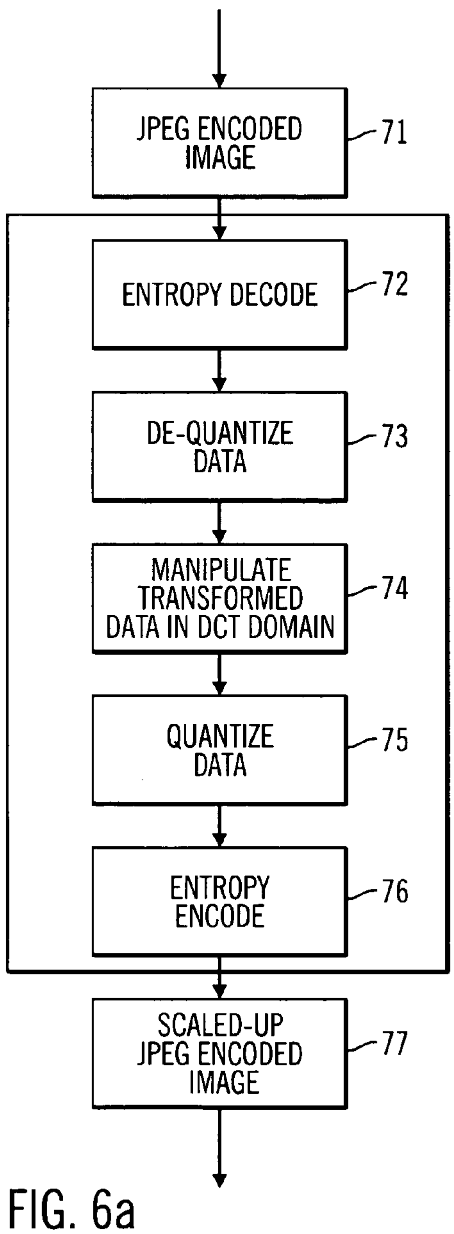
FIGS. 6*a* and 6*b* are simplified block diagrams showing the scaling up of the size of an input image by incorporating the principles of certain embodiments of the present invention.
Figure 6B:
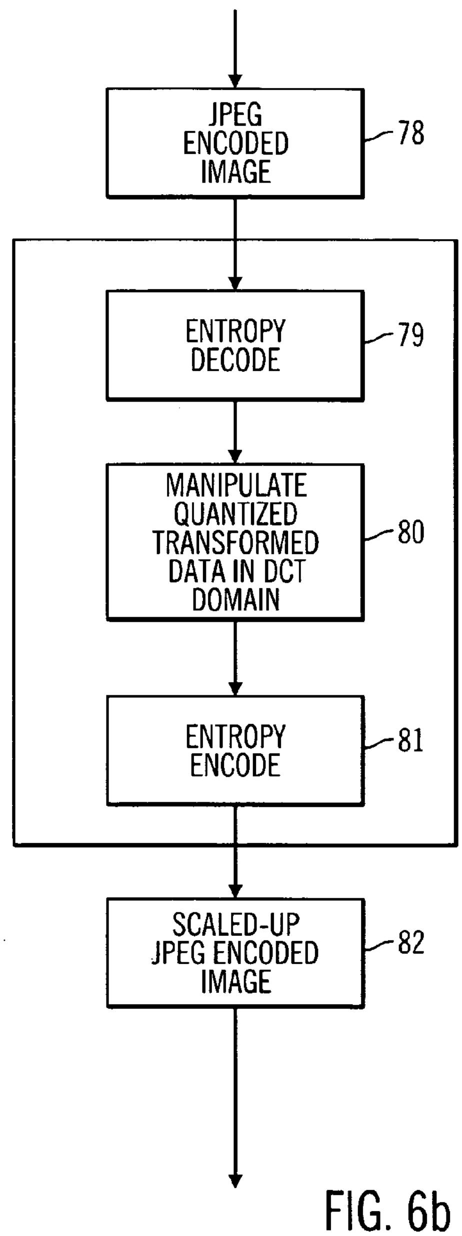

FIGS. 6*a* and 6*b* show the application of two embodiments of the present invention resulting in a faster scaling up of data. Referring first to FIG. 6*a*, the compressed image 71 is JPEG entropy decoded 72 and then de-quantized 73. As will be explained in more detail below, the transformed, dequantized data is then manipulated to create multiple blocks of transformed data while remaining in the DCT domain 74 in contrast to being processed in the real domain as shown in FIG. 5. Then the DCT coefficients of the scaled-up image are re-quantized 75 and JPEG entropy encoded 76 to produce a JPEG encoded image of scaled up dimensions 77. This can greatly increase the speed of processing image data in, for example, high speed printers.

FIG. 6*b* shows an alternative embodiment of the present invention which provides a possibly faster method of scaling up data. The compressed image 78 is JPEG entropy decoded 79 to produce quantized DCT, or transformed, data. As will be explained in more detail below, the quantized DCT coefficients are then directly manipulated and scaled up while remaining in the DCT domain 80. Then the quantized DCT coefficients of the scaled-up image are entropy encoded 81 to produce a JPEG encoded image of scaled up dimensions 82. Thus in contrast to the embodiment of FIG. 6*a*, the embodiment of FIG. 6*b* combines the de-quantizing and quantizing steps into the manipulation step 80.

Embodiments of the present invention involve scaling up transformed data while remaining in the DCT domain by multiplying the DCT coefficients directly by one or more tables of constants. The result of such multiplication is an increased number of DCT coefficients, which if inverse transformed into the real domain, would correspond to a scaled up image. As can be appreciated by a comparison of the known method of FIG. 5 with the inventive embodiments of FIGS. 6*a* and 6*b*, this relatively simple multiplication step replaces the more computationally intensive steps associated with the FDCT and IDCT operations.

As explained in more detail below, a table of constants is developed by expressing a plurality of original variables representing data samples as a second plurality of variables representing a scaled number of data samples with a scaling factor of B. B representations of B sets of new variables are expressed as the second plurality of variables. Forward transform operations are applied on the B sets of new variables to create B intermediate representations. The B intermediate representations are of the transform coefficients of the B sets of new variables as a function of the second plurality of variables. An inverse transform operation is applied on the plurality of original variables to create a third representation which is of the plurality of original variables as a function of the transform coefficients of the plurality of original variables. Finally, the transform coefficients of the B sets of new variables are expressed as a function of the transform coefficients of the plurality of original variables. This yields the table of constants which can be stored and recalled whenever desired to directly operate on the input transformed data and derive enlarged-sized image transform data.

Figure 7A:
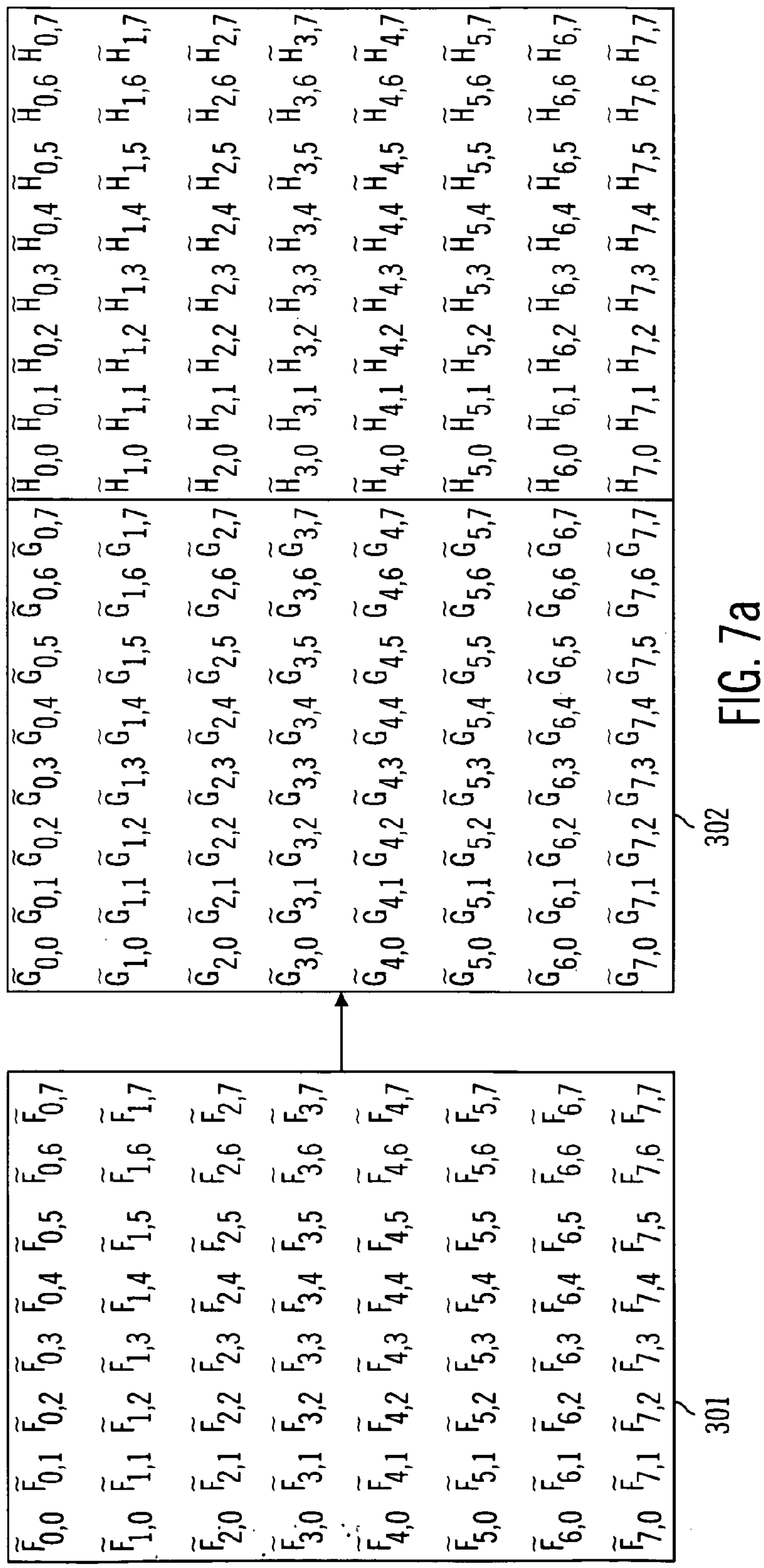
FIGS. 7*a* and 7*b* are graphical representations of the enlargement of a portion of a transformed image in accordance with the inventions disclosed herein.

Referring to FIG. 7*a*, a portion of a transformed image is represented by one 8×8 block 301 of DCT coefficients: $\tilde{F}_{0,0} \ldots \tilde{F}_{7,7}$. If for example an enlargement factor of 2 in the X axis is desired, the preferred embodiments operate directly upon these DCT coefficients to produce two 8×8 blocks 302 of DCT coefficients, $\tilde{G}_{0,0} \ldots \tilde{G}_{7,7}$ and $\tilde{H}_{0,0} \ldots \tilde{H}_{7,7}$ which, if inverse transformed, would yield an image of 2× the size of the original along the X axis.

Figure 7B:
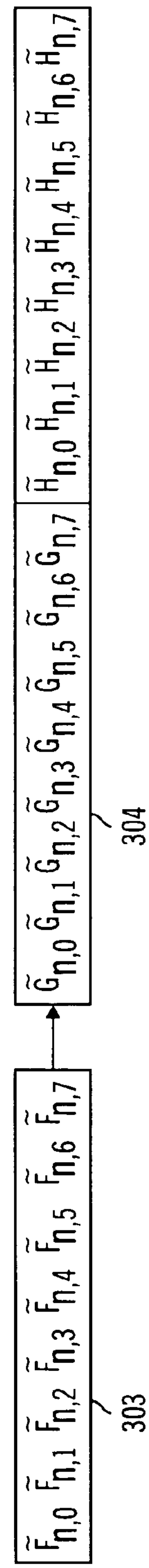

FIG. 7*a* represents the result in one dimension when all data in one block has been processed. In actual practice however, certain embodiments of the inventive methods operate in one dimension on a sub-block 303 consisting of one row of data as shown in FIG. 7*b*. The output sub-blocks or rows 304 are sequentially created until a complete, original 8×8 data block has been scaled up.

FIGS. 7*a* and 7*b* illustrate graphically the relationship between the input DCT image data, $\tilde{F}$ and the enlarged image DCT data, $\tilde{G}$, $\tilde{H}$. Mathematically, this relationship is shown as follows.

Figure 8A:
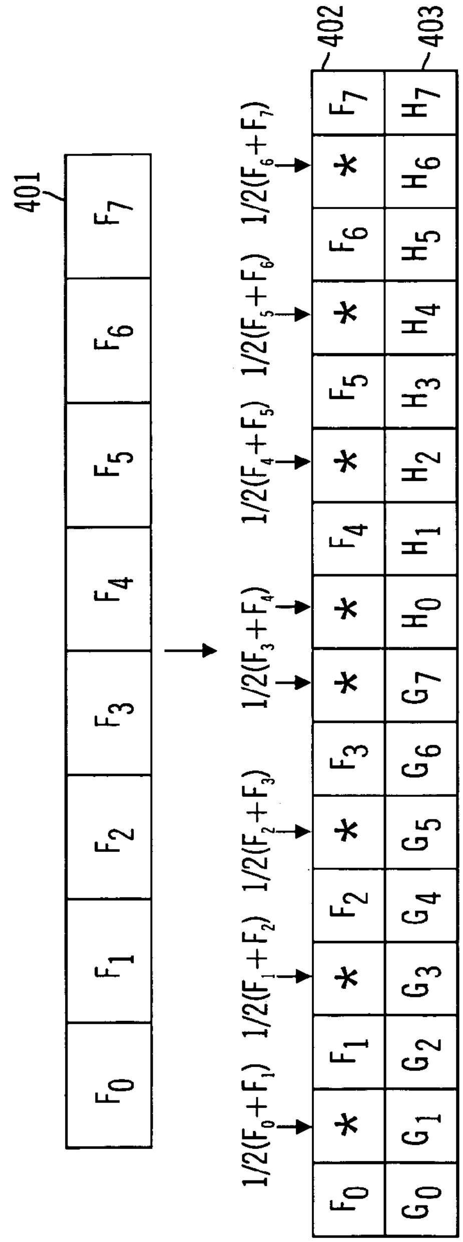
FIG. 8*a* is an illustration of a piecewise linear interpolation method for scaling up pixel or pel data in the real domain for a portion of an image.

Using for example a scale up factor of 2 in one dimension on a 1×8 pixel or pel row of values from a data block in the real domain, a representation of a set of image data is made. This is in the form of a row of data, $F_0, \ldots F_7$ FIG. 8a depicts the 1×8 data block 401 of pixel or pel values, $F_0, \ldots F_7$. Since the image is to be enlarged or scaled up by a factor of two in one dimension, the values for $F_0, \ldots F_7$ are mathematically interpolated to form an enlarged 1×16 block 402 of pixel or pel values, $F_0$, $\frac{1}{2}(F_0+F_1)$, $F_1$, $\frac{1}{2}(F_1+F_2)$, $F_2, \ldots$. Note however that with this method, the two interpolated pel values between $F_3$ and $F_4$ are equal to one another. Next, this 1×16 block 402 of values is redefined to be the same as two, adjacent 1×8 blocks 403, $G_0, \ldots, G_7$ and $H_0, \ldots, H_7$.

Mathematically, this can be represented as follows:

$$G=(F_0,\ \tfrac{1}{2}(F_0+F_1),\ F_1,\ \tfrac{1}{2}(F_1+F_2),$$
$$F_2,\ \tfrac{1}{2}(F_2+F_3),\ F_3,\ \tfrac{1}{2}(F_3+F_4))$$
$$H=(\tfrac{1}{2}(F_3+F_4),\ F_4,\ \tfrac{1}{2}(F_4+F_5),$$
$$F_5,\ \tfrac{1}{2}(F_5+F_6),\ F_6,\ \tfrac{1}{2}(F_6+F_7),\ F_7) \tag{5}$$

Next, G and H are represented in the DCT domain by use of the FDCT equation (1) as follows:

$$\tilde{G}_u = C_u \sum_{x=0}^{7} G_x \cos\left(\frac{(2x+1)\pi u}{16}\right) \text{ for } u = 0, \ldots, 7 \text{ and}$$

$$\tilde{H}_u = C_u \sum_{x=0}^{7} H_x \cos\left(\frac{(2x+1)\pi u}{16}\right) \text{ for } u = 0, \ldots, 7$$

Since the $G_x$'s and $H_x$'s in equation (6) can also be expressed in terms of the original 8 samples $F_0, \ldots, F_7$, we can use the IDCT relation of equation (3) to express the DCT coefficients for G and H as given in equation (6) in terms of the original DCT coefficients $\tilde{F}_0 \ldots \tilde{F}_7$ for the sample block F:

$$F_x = \sum_{u=0}^{7} C_u \tilde{F}_u \cos\left(\frac{(2x+1)\pi u}{16}\right)$$

By substituting equation (7) into equation (6) and regrouping, it is possible to obtain the following:

$$\tilde{G}_v = \frac{C_v}{2} \sum_{u=0}^{7} C_u \Big\{ K_1(v)\cos\left(\frac{\pi u}{16}\right) + K_2(v)\cos\left(\frac{3\pi u}{16}\right) + K_3(v)\cos\left(\frac{5\pi u}{16}\right) + K_4(v)\cos\left(\frac{7\pi u}{16}\right) + \cos\left(\frac{15\pi u}{16}\right)\cos\left(\frac{9\pi u}{16}\right) \Big\} \tilde{F}_u$$

$$\tilde{H}_v = \frac{C_v}{2} \sum_{u=0}^{7} C_u \Big\{ \cos\left(\frac{\pi v}{16}\right)\cos\left(\frac{7\pi u}{16}\right) + K_5(v)\cos\left(\frac{9\pi u}{16}\right) + K_6(v)\cos\left(\frac{11\pi u}{16}\right) + K_7(v)\cos\left(\frac{13\pi u}{16}\right) + K_8(v)\cos\left(\frac{15\pi u}{16}\right) \Big\} \tilde{F}_u \tag{9}$$

where $C_u$ and $C_v = \frac{1}{2\sqrt{2}}$ for $u, v = 0$ and where $C_u$ and $C_v = \frac{1}{2}$ for $u, v > 0$ and where $K_1(v) = 2D_1^v + D_3^v$, $K_2(v) = D_3^v + 2D_5^v + D_7^v$, $K_3(v) = D_7^v + 2D_9^v + D_{11}^v$, $K_4(v) = D_{11}^v + 2D_{13}^v + D_{15}^v$, $K_5(v) = D_1^v + 2D_3^v + D_5^v$, $K_6(v) = D_5^v + 2D_7^v + D_9^v$, $K_7(v) = D_9^v + 2D_{11}^v + D_{13}^v$, $K_8(v) = D_{13}^v + 2D_{15}^v$ and $$D_x^v \equiv \cos\left(\frac{x\pi v}{16}\right)$$

From equations (8) and (9), it can be appreciated that the values $\tilde{G}$ and $\tilde{H}$, which are the enlarged image coefficients in the DCT domain, now are expressed as a function of $\tilde{F}$ which are the original sized image coefficients, also in the DCT domain. Equations (8) and (9) show that not only are $\tilde{G}$ and $\tilde{H}$ a function of $\tilde{F}$, but that this relationship involves only constants.

Appendix A contains an exemplary table of constants which are used to obtain a scale up factor of two for a one dimensional row of values $\tilde{F}_0 \ldots \tilde{F}_7$. Thus for example, taking the first row of values from the G block matrix and the first row of the $\tilde{H}$ block matrix of Appendix A, $\tilde{G}_0$=1.00000 $\tilde{F}_0$+0.80219 $\tilde{F}_1$−0.16332 $\tilde{F}_2$−0.34258 $\tilde{F}_3$+0.00000 $\tilde{F}_4$+0.09001 $\tilde{F}_5$−0.06765 $\tilde{F}_6$−0.11079 $\tilde{F}_7$; and $\tilde{H}_0$=1.00000 $\tilde{F}_0$−0.80219 $\tilde{F}_1$−0.16332 $\tilde{F}_2$+0.34258 $\tilde{F}_3$+0.00000 $\tilde{F}_4$−0.09001 $\tilde{F}_5$−0.06765 $\tilde{F}_6$+0.11079 $\tilde{F}_7$.

Similarly for example, taking the second row of values from the $\tilde{G}$ block matrix and the second row of values from the $\tilde{H}$ block matrix of Appendix A, $\tilde{G}_1$=0.00000 $\tilde{F}_0$+0.45837 $\tilde{F}_1$+0.94346 $\tilde{F}_2$+0.48426 $\tilde{F}_3$−0.24520 $\tilde{F}_4$−0.31700 $\tilde{F}_5$+0.00000 $\tilde{F}_6$+0.11362 $\tilde{F}_7$; and $\tilde{H}_1$=0.00000 $\tilde{F}_0$+0.45837 $\tilde{F}_1$−0.94346 $\tilde{F}_2$+0.48426 $\tilde{F}_3$−0.24520 $\tilde{F}_4$−0.31700 $\tilde{F}_5$+0.00000 $\tilde{F}_6$+0.11362 $\tilde{F}_7$; and Equations (8) and (9) yield a table of constants based upon the piecewise-linear interpolation technique of equation (5). However, a similar methodology as that described above can be used to obtain alternative equations and corresponding tables of constants which are based upon other types of image enlargement techniques. For example, instead of using a piecewise-linear interpolation method, replication methods (i.e., repeating each image pel N times per axis) or spline fit methods (i.e., using polynomial curves) may be employed without departing from the spirit of the invention.

Figure 9:
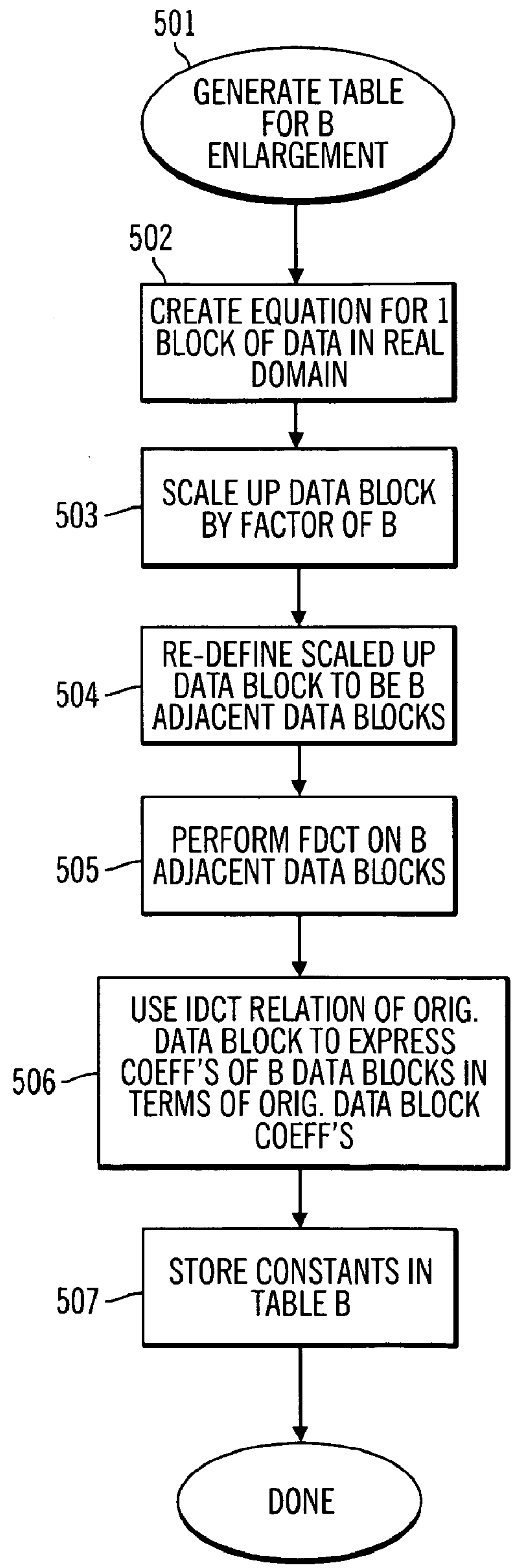
FIG. 9 illustrates the logic to generate a table of constants for the scaling up of data by a factor of B.

FIG. 9 illustrates the logic for a generalized approach in developing a table of constants in accordance with the previously described embodiment. At block 501 a determination is made as to the amount of image enlargement, B, where B is an integer. Thus for example if it is desired to enlarge an image size by a factor of 3, then B is set equal to 3. At block 502, a representation of a set of image data is created in the form of a single 1×8 block of data in the real domain. For example, this representation could be $F=(F_0, \ldots, F_7)$.

Next, the values of the single data block are scaled-up by a factor of B. This is accomplished by a piece-wise, linear interpolation method or other known scale up methods. (Block 503) Thus in the case where B=3, this would result in a total of 3×8 or 24 values for the scaled-up data block. The scaled-up data block is re-defined to be B adjacent data blocks. (Block 504) In the case where B=3, the three adjacent data block equations could be $G=(G_0, \ldots, G_7)$, $H=(H_0, \ldots, H_7)$, $I=(I_0, \ldots, I_7)$, where $G_0=F_0$, $G_1=(2F_0+F_1)/3$, $G_2=(F_0+2F_1)/3$, $G_3=F_1, \ldots I_7=(F_6+2F_7)/3$.

A FDCT is performed on the B adjacent data blocks. (Block 505) Then, the IDCT relation of the original data block, F, is used to express the DCT coefficients of the B data blocks as a function of the original data block, F. (Block 506) It has been shown that this relationship results in a group of constants which can then be stored in a Table B for future use in scaling up any input data in DCT format by a factor of B in one dimension. (Block 507)

The method of FIG. 9 can be repeated as many times as desired for different scale up factors, such as 2, 3, 4, 5, etc. Different tables of constants can be generated for each scale up factor and can be stored in computer memory. Thus a computer system containing a set of such tables will be able to rapidly perform a scale up of data by any amount selected by the user which corresponds to an available table of constants. In the example of image data, these constants can be applied directly by multiplying them by the input image DCT coefficients. This results in an output image of enlarged size in the DCT domain.

Figure 8B:
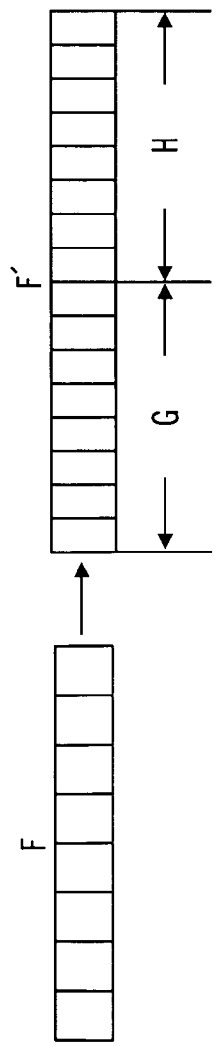
FIG. 8*b* illustrates the scaling up of pixel or pel data in the real domain as an initial step in an alternative embodiment of the present invention.

An alternative technique for developing a representation of the DCT coefficients of an enlarged image as a function of an original image's coefficients follows. Referring to FIG. 8*b*, taking the example of enlarging the original image by a factor of 2 in one dimension, a set of data representing a row from one block F in the real domain is taken. Assume that F is instead a 16 sample block formed by uniformly dividing each of the original samples in half. Call this block F'. Then, to form two, new original-scale 1×8 sample blocks G and H from F', take the respective first and second halves of F' as shown in FIG. 8*b*. Mathematically, this can be represented as $G_x=F'_x$ and $H_x=F'_{x+8}$ for x=0, . . . ,7.

Using a scaled version of equation (1) with N=16, F' can be represented in the DCT domain as:

$$\tilde{F}'_u = C_u \sum_{x=0}^{15} F'_x \cos\left(\frac{(2x+1)\pi u}{32}\right) \text{ for } u = 0, \ldots, 15 \tag{10}$$

$$\text{where } C_u = \frac{1}{2\sqrt{2}} \text{ for } u = 0,\ C_u = \frac{1}{2} \text{ for } u > 0$$

Note that the $C_u$ is defined as an 8 sample DCT notwithstanding that a 16 sample DCT is in fact being used for equation 10. Hence, these are referred to as "scaled" DCT transforms.

Similarly, by performing a scaled IDCT on $\tilde{F}'$ using a version of equation (3) where N=16, F' can be represented as:

$$F'_x = \sum_{v=0}^{15} C_v \tilde{F}'_v \cos\left(\frac{(2x+1)\pi v}{32}\right) \text{ for } x = 0, \ldots, 15 \tag{11}$$

-continued $$\text{where } C_v = \frac{1}{2\sqrt{2}} \text{ for } v = 0,\ C_v = \frac{1}{2} \text{ for } v > 0$$

However, since we are really working with an 8-sample block, it follows that $\tilde{F}_v=0$ for v=8, . . . ,15. Equation (11), therefore becomes:

$$F'_x = \sum_{v=0}^{7} C_v \tilde{F}_v \cos\left(\frac{(2x+1)\pi v}{32}\right) \text{ for } x = 0, \ldots, 15 \tag{12}$$

$$\text{where } C_v = \frac{1}{2\sqrt{2}} \text{ for } v = 0,\ C_v = \frac{1}{2} \text{ for } v > 0$$

Since $G_x=F'_x$ and $H_x=F'_{x+8}$ for x=0, . . . ,7, equation (12) can be expressed:

$$G_x = \sum_{v=0}^{7} C_v \tilde{F}_v \cos\left(\frac{(2x+1)\pi v}{32}\right) \text{ for } x = 0, \ldots, 7 \text{ and} \tag{13}$$

$$H_x = \sum_{v=0}^{7} C_v \tilde{F}_v \cos\left(\frac{(2x+17)\pi v}{32}\right) \text{ for } x = 0, \ldots, 7$$

$$\text{where } C_v = \frac{1}{2\sqrt{2}} \text{ for } v = 0,\ C_v = \frac{1}{2} \text{ for } v > 0$$

$$\begin{aligned} \tilde{G}_u &= C_u \sum_{x=0}^{7} G_x \cos\left(\frac{(2x+1)\pi u}{16}\right) \\ &= \sum_{v=0}^{7} C_u C_v \sum_{x=0}^{7} \tilde{F}_v \cos\left(\frac{(2x+1)\pi v}{32}\right) \\ &= \sum_{v=0}^{7} C_u C_v \left(\sum_{x=0}^{7} \cos\left(\frac{(2x+1)\pi u}{16}\right) \cos\left(\frac{(2x+1)\pi v}{32}\right)\right) \tilde{F}_v \\ &\text{for } x = 0, \ldots 7 \text{ and} \end{aligned} \tag{14}$$

$$\begin{aligned} \tilde{H}_u &= \sum_{x=0}^{7} C_u C_v \left(\sum_{x=0}^{7} \cos\left(\frac{(2x+1)\pi u}{16}\right) \cos\left(\frac{(2x+1)\pi v}{32}\right)\right) \tilde{F}_v \\ &\text{for } x = 0, \ldots 7 \\ &\text{where } C_u \text{ and } C_v = \frac{1}{2\sqrt{2}} \text{ for } v = 0 \text{ and} \\ &\text{where } C_u \text{ and } C_v = \frac{1}{2} \text{ for } u, v > 0 \end{aligned} \tag{15}$$

where $C_u$ and $C_v=\frac{1}{2}$ for u, v>0

As before, it is apparent from equations (14) and (15) that not only are $\tilde{G}$ and $\tilde{H}$ a function of $\tilde{F}$, but that these relationships involve only constants. Appendix B contains an exemplary table of constants which are used to obtain a scale up factor of 2 in a one dimensional row for values $\tilde{F}_0 \ldots \tilde{F}_7$ under this embodiment. It will be noted that the constants in both Appendices A and B, although different, can be used to achieve a scale up factor of 2. The choice is left to the user based upon user needs and preferences.

Once again, it can be appreciated that although the above described embodiment is illustrative of a scale up by a factor of 2 in one dimension, similar methodologies can be employed to develop equations and corresponding tables of constants for other scale up factors B, where B=3, 4, 5, etc.

Figure 10:
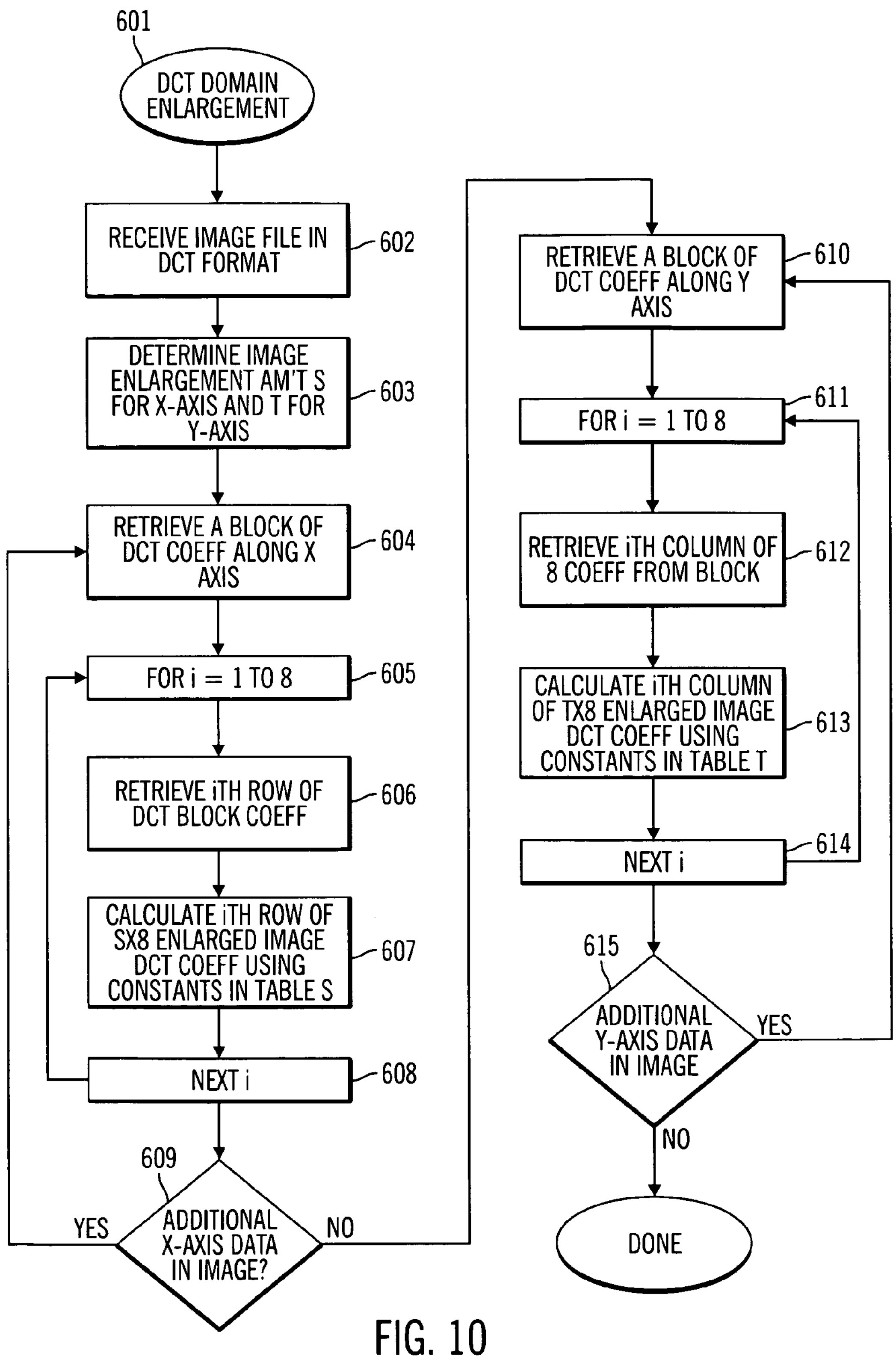
FIG. 10 illustrates the logic to enlarge the dimensions of the whole of an input transformed image.

FIG. 10 illustrates the steps for employing these tables of constants to enlarge the size of an input image. The process commences with the receipt of an image file in DCT format. (Blocks 601 & 602). A determination is made of the amount of image scale up in both the X-axis and Y-axis. (Block 603) The enlargement amounts do not have to be equal in both axes. Thus for example if the user desired a 2× image scale up for the X-axis and a 4× scale up for the Y-axis, then for purposes of FIG. 10, S=2 and T=4.

Next an enlargement procedure along the X-axis is commenced by retrieving a block of DCT coefficients along the X-axis. (Block 604) The $1^{st}$ row or sub-block of 8 coefficients from the block is retrieved (block 606) and used to calculate the $1^{st}$ row of S×8 enlarged image DCT coefficients using the constants previously stored in Table S. In the case where a 2× enlargement is selected, 2×8, or 16, coefficients would be calculated. (Block 607) These coefficients would represent the $1^{st}$ row of two 1×8 data blocks along the X-axis.

Table S is one of two or more tables of constants stored in computer memory, each of which can be used to scale up image data by a different factor. In this example, Table S contains the constants which correspond to a scale up factor of 2. This calculation is accomplished by multiplying the 8 coefficients of the original image by the constants from Table S.

The process of blocks 606 and 607 is repeated for rows or sub-blocks 2 through 8 of the retrieved data block to thereby generate S 8×8 blocks of enlarged image coefficients along the X-axis. Next, a determination is made whether the original image contains additional data blocks along the X-axis to be processed. (Block 609) If so, control loops to block 604 where the next block of DCT coefficients is retrieved. The previously described process continues until all X-axis image data has been scaled up.

When there is no longer any X-axis image data to scale up, control transfers to block 610 where a block of DCT coefficients along the Y-axis is retrieved. In the case where a Y-axis image scale up factor of 3 is selected, then 3×8, or 24, coefficients would be calculated. These coefficients would constitute the $1^{st}$ column of three 1×8 data blocks along the Y-axis. The process of blocks 610 through 615 of FIG. 10 is the same as that described for blocks 604 through 609 except that now the calculations proceed along columns of data for Y-axis enlargement, rather than along rows of data.

From FIGS. 6*a* and 10 it can be seen that by maintaining tables of constants in memory for various scale up amounts, such as 2, 3, 4, 5, etc., it is possible to rapidly transform a smaller image which is represented by a file containing DCT domain data into a larger sized image by multiplying the DCT domain data with these constants. It is not necessary to perform an IDCT to transform the image into the spatial domain, enlarge the image size while in the spatial domain, and then perform a FDCT to again transform the image file—a procedure which is computationally much more intensive.

The foregoing has been described with respect to data blocks of 8×8 data. However it should be appreciated that the inventions claimed herein can apply to any data block which, for these purposes, is meant to be any set of data including, but not limited to, one or two dimensional arrays of data of any size.

Referring again to FIG. 6*b*, it further should be appreciated by those skilled in the art that an alternative embodiment of the present invention involves the incorporation of the de-quantization and re-quantization steps into the tables of constants, or matrices, in the following way:

Assume that the constants defining a particular block of a particular one dimensional transform-based scale-up scheme are known to be $D=(d_{ij})$ with i,j=0, . . . , 7. Let $Q=(q_i)$ and $R=(r_i)$ (with i=0, . . . ,7) be the desired quantization vectors for the input and output, respectively. These quantizations can be incorporated into the transform matrix D to obtain new constants $C=(c_{ij})$ where $c_{ij}=d_{ij}\cdot(q_j/r_i)$. Thus by including the de-quantization and re-quantization values in the tables of constants, it can be seen that even faster scaling up operations can be realized.

Thus using this method, a plurality of input and output quantization values is received. Also a block of quantized transformed data samples associated with the input quantization values is received wherein the block of quantized transformed data samples represents a block of original data samples. A table of constants capable of increasing the number of transformed data samples by a different factor is selected. The plurality of input and output quantization values are applied to the selected table of constants to produce a plurality of new constants. The plurality of new constants is applied to the block of quantized transformed data samples to produce at least two blocks of quantized transformed data samples associated with the output quantization values wherein the quantized transformed data samples represent at least two blocks of final data samples.

An advantage of the approaches of either FIG. 6*a* or FIG. 6*b* is that it is not necessary to handle 64×N samples during the enlarging process. It is a characteristic of the JPEG standard that the original, quantized DCT coefficients are usually rather sparse and that most rows in the blocks contain coefficients which are a value of zero. Thus under this method, the enlarged blocks will keep these rows as zeros. Other rows frequently have only 1, 2 or 3 coefficients that are non-zero. These cases can be handled with much simplified equations that have discarded the zero terms.

Another advantage of the disclosed embodiments relates to the conducting of these computations in one dimension. Blocks of data are scaled up independently along each axis. Thus one is not restricted to identical scaling in the X and Y directions. For example, an image could be enlarged by a factor of 3 on the X-axis and by a factor of 2 on the Y-axis.

Because some embodiments of the disclosed method incorporates independent treatment of each axis in one dimension, it is further possible to scale up the image size on one axis and reduce the size on the other axis. In an alternative embodiment, the scaling down of images in DCT format can be accomplished through the use of tables of constants which are derived from equations based upon scale down algorithms. These equations and constants are described as follows:

For example using an image reduction factor of 2 in one dimension on a one-dimensional data block of 1×8 coefficients, a representation of a plurality of transform coefficients of a set of variables is made. This is in the form of a row of data in one dimension for two adjacent data blocks, $\tilde{G}_0, \ldots \tilde{G}_7, \tilde{H}_0, \ldots \tilde{H}_7$. The relationship between each value in the spatial domain and its counterpart in the DCT domain is represented by the IDCT equations as follows:

$$G_x = \sum_{u=0}^{7} C_u \tilde{G}_u \cos\left(\frac{(2x+1)\pi u}{16}\right) \quad (16)$$

$$H_x = \sum_{u=0}^{7} C_u \tilde{H}_u \cos\left(\frac{(2x+1)\pi u}{16}\right) \text{ where} \quad (17)$$

$$C = \frac{I}{\sqrt{8}} \text{ for } u = 0 \text{ and } C = \frac{1}{2} \text{ for } u > 0$$

where $C+1/\sqrt{8}$ for u=0 and C=½ for u>0

Using for example a low pass filtering technique, each pair of these values is averaged to achieve the image reduction of ½ in one dimension which is represented as follows:

$F_0=½(G_0+G_1)$, $F_1=½(G_2+G_3)$, . . . , $F_7=½(H_6+H_7)$

The FDCT equation is applied to each spatial domain value of the reduced image to transform these back into the DCT domain:

$$\tilde{F}_v = C_v \sum_{x=0}^{7} F_x \cos\left(\frac{(2x+1)\pi u}{16}\right),\ v = 0, \ \ldots\ , 7 \quad (19)$$

Now, since $F_0=½(G_0+G_1)$, $F_1=½(G_2+G_3)$, . . . $F_7=½(H_6+H_7)$, each of these expressions for $F_0$, . . . $F_7$ can be substituted in equation (19) which can then be represented as follows:

$$\tilde{F}_v = C_v \sum_{x=0}^{3} \left\{\frac{1}{2}(G_{2x} + G_{2x+1})\right\} \cos\left(\frac{(2x+1)\pi u}{16}\right) + C_v \sum_{x=4}^{7} \left\{\frac{1}{2}(H_{2x-8} + H_{2x-7})\right\} \cos\left(\frac{(2x+1)\pi u}{16}\right) \quad (20)$$

The expressions for G and H from equations (16) and (17) can be substituted for each occurrence of G and H in equation (20) as follows:

$$\tilde{F}_v = C_v \left[ \sum_{x=0}^{3} \frac{1}{2} \left\{ \sum_{u=0}^{7} C_u \tilde{G}_u \cos\left(\frac{(4x+1)\pi u}{16}\right) + \sum_{u=0}^{7} C_u \tilde{G}_u \cos\left(\frac{(4x+3)\pi u}{16}\right) \right\} \cos\left(\frac{(2x+1)\pi v}{16}\right) + \sum_{x=4}^{7} \frac{1}{2} \left\{ \sum_{u=0}^{7} C_u \tilde{H}_u \cos\left(\frac{(4x-15)\pi u}{16}\right) + \sum_{u=0}^{7} C_u \tilde{H}_u \cos\left(\frac{(4x-13)\pi u}{16}\right) \right\} \cos\left(\frac{(2x+1)\pi v}{16}\right) \right] \quad (21)$$

From equation (21) it can be appreciated that the values $\tilde{F}$ which are reduced image coefficients in the DCT domain now are a function of $\tilde{G}$ and $\tilde{H}$ which are the original sized image coefficients, also in the DCT domain. Equation (21) can be algebraically simplified into the following representation:

$$\tilde{F}_v = \frac{1}{2} \sum_{u=0}^{7} C_u C_v \left\{ \left[ \sum_{x=0}^{3} \cos\left(\frac{(4x+1)\pi u}{16}\right) + \cos\left(\frac{(4x+3)\pi u}{16}\right) \right] \cos\left(\frac{(2x+1)\pi v}{16}\right) \tilde{G}_u + \left[ \sum_{x=4}^{7} \cos\left(\frac{(4x-15)\pi u}{16}\right) + \cos\left(\frac{(4x-13)\pi u}{16}\right) \right] \cos\left(\frac{(2x+1)\pi v}{16}\right) \tilde{H}_u \right\} \quad (22)$$

$$\text{for } v = 0, \ \ldots\ , 7$$

From equation (22) it is apparent that not only is $\tilde{F}$ a function of $\tilde{G}$ and $\tilde{H}$, but that this relationship involves only constants.

Equation (22) yields a table of constants based upon a low pass filter technique where $F_0=½(G_0+G_1)$, $F_1=½(G_2+G_3)$, etc. However, a similar methodology as that described above can be used to obtain alternative equations and corresponding tables of constants which are based upon other types of filters.

For example instead of a low pass filter which is based upon the averaging of two values, a 1:2:1 filter, collocated on the left, could be used. Data filtered by this algorithm is represented as $F_0=(3G_0+G_1)/4$, $F_1=(G_1+2G_2+G_3)/4$, $F_2=(G_3+2G_4+G_5)/4$, . . . , $F_7=(H_5+2H_6+H_7)/4$. Similarly, a 1:2:1 filter, collocated on the right, could be used. This is represented by $F_0=(G_1+2G_2+G_3)/4$, $F_1=(G_3+2G_4+G_5)/4$, . . . , $F_6=(H_4+2H_5+H_6)/4$, $F_7=(H_6+3H_7)/4$. Other filters can be employed without departing from the spirit of the invention.

Moreover, alternative embodiments of scale-down methods and apparatuses are described in greater detail in co-pending application Ser. No. 09/570,849, filed concurrently herewith which application is incorporated herein by reference in its entirety.

A mixing and matching of tables of constants for scaling up and scaling down can extend to sequential operations on the same image to achieve scaling by a ratio of integer amounts. When applied alone, the tables of constants only scale an image by integer amounts. That is, if an image reduction, or scale down, is desired, then applying only one table of constants to an image permits image reduction of 1/B, where B is an integer. Similarly, applying only one table of constants for image enlargement, or scaling up, permits enlargement by a factor of A, where A is an integer.

However, by applying a combination of tables, one each for scaling up and scaling down, to image data, then additional non-integer resizing factors can be achieved. For example, if it is desired to enlarge an image by a factor of 2.5, such would not be possible by the use of one scale-up table alone. No integer value for A will result in a scale-up factor of 2.5. However, a table of constants for scaling up an image by a factor of 5 can be used followed by another table for scaling down the enlarged image by ½. The final image therefore would be resized by a value of 5/2 or 2.5.

Thus it can be seen that by employing any number of combinations of tables for the scaling up and scaling down of an image, a large variety of resizing factors can be achieved. FIG. 11 is a table of values illustrating various integer and non-integer resizing factors which can be achieved with a set of 22 tables—11 for scaling up data by factors of 2 through 12, and 11 tables for scaling down data by ½ through 1/12. In FIG. 11, dots (.) are placed in those locations where the values are repeated in the table of FIG. 11 and thus are not necessary.

Still referring to FIG. 11, if for example it is desired to create a new image which is 0.75 of the size of the original image, then that value is located in the table. It can be seen that 0.75 corresponds to a numerator A of 3 and a denominator B of 4. By taking image data and applying the table of constants corresponding to a scale up of 3, followed by the application of a second table of constants corresponding to a scale down of ¼, then the resulting image would be resized by a factor of ¾, or 0.75, of the original.

The values in the table of FIG. 11 can be placed in a computer look-up table format whereby the numerators and denominators corresponding to multiple, non-integer and integer resizing factors can be easily retrieved, and the tables of constants corresponding to those numerators and denominators can be sequentially employed for any given input, transformed image data.

Although the table of FIG. 11 illustrates resizing factors for A and B equal to 1 through 12, it will be appreciated that tables similar to FIG. 11, but using a far greater number of values for A and B, can be employed.

In summary, preferred embodiments disclose a method, system and data structure for enlarging the size of an input image in transformed format. (These could have come from compressed data that has been entropy decoded.) A block of transformed data samples is received. The block of transformed data samples represents a block of original data samples. One of at least two tables of constants is selected wherein each table of constants is capable of increasing the number of transformed data samples by a different factor. The constants taken from the selected table are applied to the block of transformed data samples to produce at least two blocks of transformed data samples representing at least two blocks of final data samples.

In another embodiment, a method for generating a plurality of constants for use in increasing a number of original data samples by a factor of B is provided. A plurality of original variables representing data samples are expressed as a second plurality of variables representing a scaled number of data samples with a scaling factor of B. B representations of B sets of new variables are expressed as the second plurality of variables. Transform operations are applied on the B sets of new variables and the plurality of original variables to obtain a transformation from transform coefficients of the plurality of original variables into transform coefficients of the B sets of new variables. This, in turn, yields the plurality of constants.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

Appendix A

Constant matrix defining transform for the $\tilde{G}$ block of 1 to 2 scale-up.

| | | | | | | | |
|---|---|---|---|---|---|---|---|
| 1.00000 | 0.80219 | −0.16332 | −0.34258 | 0.00000 | 0.09001 | −0.06765 | −0.11079 |
| 0.00000 | 0.45837 | 0.94346 | 0.48426 | −0.24520 | −0.31700 | 0.00000 | 0.11362 |
| 0.00000 | −0.07207 | 0.08839 | 0.62382 | 0.78858 | 0.27793 | −0.21339 | −0.22963 |
| 0.00000 | 0.03819 | 0.00000 | −0.06486 | 0.20787 | 0.61441 | 0.57483 | 0.21575 |
| 0.00000 | −0.01381 | 0.02802 | 0.08192 | 0.00000 | 0.03650 | 0.39429 | 0.52251 |
| 0.00000 | 0.01280 | 0.00000 | 0.01085 | 0.13889 | 0.13809 | −0.17148 | −0.33681 |
| 0.00000 | −0.00128 | 0.03661 | 0.06197 | −0.05604 | −0.17885 | −0.08839 | 0.04852 |
| 0.00000 | 0.01007 | −0.00743 | −0.05800 | −0.04877 | 0.00570 | 0.00000 | −0.03159 |

Constant matrix defining transform for the $\tilde{H}$ block of 1 to 2 scale-up.

| | | | | | | | |
|---|---|---|---|---|---|---|---|
| 1.00000 | −0.80219 | −0.16332 | 0.34258 | 0.00000 | −0.09001 | −0.06765 | 0.11079 |
| 0.00000 | 0.45837 | −0.94346 | 0.48426 | 0.24520 | −0.31700 | 0.00000 | 0.11362 |
| 0.00000 | 0.07207 | 0.08839 | −0.62382 | 0.78858 | −0.27793 | −0.21339 | 0.22963 |
| 0.00000 | 0.03819 | 0.00000 | −0.06486 | −0.20787 | 0.61441 | −0.57483 | 0.21575 |
| 0.00000 | 0.01381 | 0.02802 | −0.08192 | 0.00000 | −0.03650 | 0.39429 | −0.52251 |
| 0.00000 | 0.01280 | 0.00000 | 0.01085 | −0.13889 | 0.13809 | 0.17148 | −0.33681 |
| 0.00000 | 0.00128 | 0.03661 | −0.06197 | −0.05604 | 0.17885 | −0.08839 | −0.04852 |
| 0.00000 | 0.01007 | 0.00743 | −0.05800 | 0.04877 | 0.00570 | 0.00000 | −0.03159 |

Appendix B

Constant matrix defining transform for the $\tilde{G}$ block of 1 to 2 scale-up.

| | | | | | | | |
|---|---|---|---|---|---|---|---|
| 1.00000 | 0.90176 | 0.00000 | −0.30449 | 0.00000 | 0.18750 | 0.00000 | −0.13933 |
| 0.00000 | 0.42234 | 1.00000 | 0.77023 | 0.00000 | −0.31383 | 0.00000 | 0.21344 |
| 0.00000 | −0.08272 | 0.00000 | 0.53912 | 1.00000 | 0.71850 | 0.00000 | −0.28617 |
| 0.00000 | 0.03407 | 0.00000 | −0.13445 | 0.00000 | 0.56678 | 1.00000 | 0.70296 |
| 0.00000 | −0.01767 | 0.00000 | 0.06172 | 0.00000 | −0.14999 | 0.00000 | 0.57484 |
| 0.00000 | 0.00998 | 0.00000 | −0.03321 | 0.00000 | 0.06978 | 0.00000 | −0.15250 |
| 0.00000 | −0.00556 | 0.00000 | 0.01805 | 0.00000 | −0.03572 | 0.00000 | 0.06727 |
| 0.0000 | 0.00251 | 0.00000 | −0.00807 | 0.00000 | 0.01554 | 0.00000 | −0.02765 |

Constant matrix defining transform for the $\tilde{H}$ block of 1 to 2 scale-up.

| | | | | | | | |
|---|---|---|---|---|---|---|---|
| 1.00000 | −0.90176 | 0.00000 | 0.30449 | 0.00000 | −0.18750 | 0.00000 | 0.13933 |
| 0.00000 | 0.42234 | −1.00000 | 0.77023 | 0.00000 | −0.31383 | 0.00000 | 0.21344 |
| 0.00000 | 0.08272 | 0.00000 | −0.53912 | 1.00000 | −0.71850 | 0.00000 | 0.28617 |
| 0.00000 | 0.03407 | 0.00000 | −0.13445 | 0.00000 | 0.56678 | −1.00000 | 0.70296 |
| 0.00000 | 0.01767 | 0.00000 | −0.06172 | 0.00000 | 0.14999 | 0.00000 | −0.57484 |
| 0.00000 | 0.00998 | 0.00000 | −0.03321 | 0.00000 | 0.06978 | 0.00000 | −0.15250 |
| 0.00000 | 0.00556 | 0.00000 | −0.01805 | 0.00000 | 0.03572 | 0.00000 | −0.06727 |
| 0.0000 | 0.00251 | 0.00000 | −0.00807 | 0.00000 | 0.01554 | 0.00000 | −0.02765 |

What is claimed is:

1. A method for scaling up a number of data samples, the method comprising:

receiving a block of transformed data samples, the block of transformed data samples representing a block of original data samples;

selecting one of at least two tables of constants wherein each table of constants is capable of increasing the number of transformed data samples by a different factor; and applying the constants taken from the selected table to the block of transformed data samples to produce at least two blocks of transformed data samples representing at least two blocks of final data samples.

2. The method of claim 1 wherein the step of applying the constants further comprises:

multiplying a sub-block of transformed data samples by the constants, the sub-block being taken from the block of transformed data samples.

3. The method of claim 2, in which:

the method is for scaling up the number of data samples by a factor of B; and the step of multiplying the sub-block of transformed data samples results in B adjacent sub-blocks of transformed data samples.

4. The method of claim 1 wherein:

the method is for scaling up the number of data samples by a factor of B; and the step of applying the constants further comprises applying the constants to the block of transformed data samples to produce for each block a set of B adjacent blocks of transformed data samples representing B blocks of final data samples.

5. The method of claim 1 wherein the method is for scaling up the number of data samples by a factor of 2 and the values of the constants taken from the selected table are determined in accordance with:

$$\tilde{G}_v = \frac{C_v}{2}\sum_{u=0}^{7} C_u\left\{K_1(v)\cos\left(\frac{\pi u}{16}\right) + K_2(v)\cos\left(\frac{3\pi u}{16}\right) + K_3(v)\cos\left(\frac{5\pi u}{16}\right) + K_4(v)\cos\left(\frac{7\pi u}{16}\right) + \cos\left(\frac{15\pi v}{16}\right)\cos\left(\frac{9\pi u}{16}\right)\right\}\tilde{F}_u$$

6. The method of claim 1 wherein the method is for scaling up the number of data samples by a factor of 2 and the values of the constants taken from the selected table are determined in accordance with:

$$\begin{aligned}\tilde{G}_u &= C_u\sum_{x=0}^{7} G_x\cos\left(\frac{(2x+1)\pi u}{16}\right)\\ &= \sum_{v=0}^{7} C_u C_v \sum_{x=0}^{7} \tilde{F}_v\cos\left(\frac{(2x+1)\pi v}{32}\right)\\ &= \sum_{v=0}^{7} C_u C_v\left(\sum_{x=0}^{7}\cos\left(\frac{(2x+1)\pi u}{16}\right)\cos\left(\frac{(2x+1)\pi v}{32}\right)\right)\tilde{F}_v\end{aligned}$$

for $x = 0, \ldots 7$

7. The method of claim 1 wherein the data samples are image component samples.

8. The method of claim 1 wherein the number of data samples is in an array having a first and a second dimension, wherein the block of transformed data samples is in an array having a first and a second dimension, and wherein the constants are applied to the first dimension of the transformed data sample array to produce at least two blocks of transformed data samples representing at least two blocks of final data samples in the first dimension.

9. A method for scaling up a number of data samples in an array having a first and a second dimension, the method comprising:

receiving a block of transformed data samples in an array having a first and a second dimension, the block of transformed data samples representing a block of original data samples;

selecting a first table from a group of at least two tables of constants wherein the first table of constants is capable of increasing the number of transformed data samples by a first factor;

applying the constants taken from the first table to the first dimension of the transformed data sample array to produce at least two blocks of transformed data samples representing at least two blocks of final data samples in the first dimension;

selecting a second table from the group of at least two tables of constants, wherein the second table of constants is capable of increasing the number of transformed data samples by a second factor; and applying the constants taken from the second table to the second dimension of the transformed data sample array to produce at least two blacks of transformed data samples representing at least two blocks of final data samples in the second dimension.

10. A method for scaling up a number of data samples by a factor of $$\frac{A}{B},$$

where A and B are integers>1 and where A>B, the method comprising:

receiving a block of transformed data samples, the block of transformed data samples representing a block of original data samples;

selecting a first table and a second table from a group of at least two tables of constants;

applying the constants taken from the first table to the block of transformed data samples to produce A blocks of transformed data samples representing A blocks of intermediate data samples; and applying the constants taken from the second table to the A blocks of transformed data samples to produce $$\frac{A}{B}$$

blocks of transformed data samples representing $$\frac{A}{B}$$

blocks of final data samples.

11. A method for scaling up a number of data samples, the method comprising:

receiving a plurality of input quantization values;

receiving a block of quantized transformed data samples associated with the input quantization values, the block of quantized transformed data samples representing a block of original data samples;

selecting a table of constants capable of increasing the number of transformed data samples;

applying the plurality of input quantization values to the selected table of constants to produce a plurality of new constants; and applying the plurality of new constants to the block of quantized transformed data samples to produce at least two blocks of transformed data samples representing at least two blocks of final data samples.

12. A method for scaling up a number of data samples, the method comprising:

receiving a plurality of output quantization values;

receiving a block of transformed data samples representing a block of original data samples;

selecting a table of constants capable of increasing the number of transformed data samples;

applying the plurality of output quantization values to the selected table of constants to produce a plurality of new constants; and applying the plurality of new constants to the block of transformed data samples to produce at least two blocks of quantized transformed data samples associated with the output quantization values, the quantized transformed data samples representing at least two blocks of final data samples.

13. A method for scaling up a number of data samples, the method comprising:

receiving a plurality of input and output quantization values;

receiving a block of quantized transformed data samples associated with the input quantization values, the block of quantized transformed data samples representing a block of original data samples;

selecting a table of constants capable of increasing the number of transformed data samples by a different factor;

applying the plurality of input and output quantization values to the selected table of constants to produce a plurality of new constants; and applying the plurality of new constants to the block of quantized transformed data samples to produce at least two blocks of quantized transformed data samples associated with the output quantization values, the quantized transformed data samples representing at least two blocks of final data samples.

14. A system for scaling up a number of data samples, comprising:

a processing unit capable of executing software routines; and program logic executed by the processing unit, comprising:

means for receiving a block of transformed data samples, the block of transformed data samples representing a block of original data samples;

means for selecting one of at least two tables of constants wherein each table of constants is capable of increasing the number of transformed data samples by a different factor; and means for applying the constants taken from the selected table to the block of transformed data samples to produce at least two blocks of transformed data samples representing at least two blocks of final data samples.

15. The system of claim 14 wherein the means for applying the constants further comprises:

means for multiplying a sub-block of transformed data samples by the constants, the sub-block being taken from the block of transformed data samples.

16. The system of claim 15, in which:

the system is for scaling up the number of data samples by a factor of B; and the means for multiplying a sub-block of transformed data samples results in B adjacent sub-blocks of transformed data samples.

17. The system of claim 14 wherein:

the system is for scaling up the number of data samples by a factor of B; and the means for applying the constants further comprises means for applying the constants to the block of transformed data samples to produce for each block a set of B adjacent blocks of transformed data samples representing B blocks of final data samples.

18. The system of claim 14 wherein the system is for scaling up the number of data samples by a factor of 2 and the values of the constants taken from the selected table are determined in accordance with:

$$\tilde{G}_v = \frac{C_v}{2}\sum_{u=0}^{7} C_u\Big\{K_1(v)\cos\Big(\frac{\pi u}{16}\Big) + K_2(v)\cos\Big(\frac{3\pi u}{16}\Big) + K_3(v)\cos\Big(\frac{5\pi u}{16}\Big) + K_4(v)\cos\Big(\frac{7\pi u}{16}\Big) + \cos\Big(\frac{15\pi u}{16}\Big)\cos\Big(\frac{9\pi u}{16}\Big)\Big\}\tilde{F}_u$$

and $$\tilde{H}_v = \frac{C_v}{2}\sum_{u=0}^{7} C_u\Big\{\cos\Big(\frac{\pi v}{16}\Big)\cos\Big(\frac{7\pi u}{16}\Big) + K_5(v)\cos\Big(\frac{9\pi u}{16}\Big) + K_6(v)\cos\Big(\frac{11\pi u}{16}\Big) + K_7(v)\cos\Big(\frac{13\pi u}{16}\Big) + K_8(v)\cos\Big(\frac{15\pi u}{16}\Big)\Big\}\tilde{F}_u$$

where $C_u$ and $C_v = \frac{1}{2\sqrt{2}}$ for $u, v = 0$ and where $C_u$ and $C_v = \frac{1}{2}$ for $u, v > 0$ and where $K_1(v) = 2D_1^v + D_3^v$, $K_2(v) = D_3^v + 2D_5^v + D_7^v$, $K_3(v) = D_7^v + 2D_9^v + D_{11}^v$, $K_4(v) = D_{11}^v + 2D_{13}^v + D_{15}^v$, $K_5(v) = D_1^v + 2D_3^v + D_5^v$, $K_6(v) = D_5^v + 2D_7^v + D_9^v$, $K_7(v) = D_9^v + 2D_{11}^v + D_{13}^v$, $K_8(v) = D_{13}^v + 2D_{15}^v$ and $D_x^v \equiv \cos\Big(\frac{x\pi v}{16}\Big)$.

19. The system of claim 14 wherein the system is for scaling up the number of data samples by a factor of 2 and the values of the constants taken from the selected table are determined in accordance with:

$$\tilde{G}_u = C_u\sum_{x=0}^{7} G_x\cos\Big(\frac{(2x+1)\pi u}{16}\Big) = \sum_{v=0}^{7} C_u C_v \sum_{x=0}^{7}\tilde{F}_v\cos\Big(\frac{(2x+1)\pi v}{32}\Big) = \sum_{v=0}^{7} C_u C_v\Big(\sum_{x=0}^{7}\cos\Big(\frac{(2x+1)\pi u}{16}\Big)\cos\Big(\frac{(2x+1)\pi v}{32}\Big)\Big)\tilde{F}_v$$

for $x = 0, \ldots 7$ and $$\tilde{H}_u = \sum_{v=0}^{7} C_u C_v\Big(\sum_{x=0}^{7}\cos\Big(\frac{(2x+1)\pi u}{16}\Big)\cos\Big(\frac{(2x+17)\pi v}{32}\Big)\Big)\tilde{F}_v$$

for $x = 0, \ldots 7$

-continued where $C_u$ and $C_v = \frac{1}{2\sqrt{2}}$ for $u, v = 0$ and where $C_u$ and $C_v = \frac{1}{2}$ for $u, v > 0$.

20. A system for scaling up a number of data samples by a factor of $$\frac{A}{B},$$

where A and B are integers>1 and where A>B, the system comprising:

a processing unit capable of executing software routines; and program logic executed by the processing unit, comprising:

means for receiving a block of transformed data samples, the block of transformed data samples representing a block of original data samples;

means for selecting a first table and a second table from a group of at least two tables of constants;

means for applying the constants taken from the first table to the block of transformed data samples to produce A blocks of transformed data samples representing A blocks of intermediate data samples; and means for applying the constants taken from the second table to the A blocks of transformed data samples representing the enlarged number of data samples to produce $$\frac{A}{B}$$

blocks of transformed data samples representing $$\frac{A}{B}$$

of final data samples.

21. A system for scaling up a number of data samples, comprising:

a processing unit capable of executing software routines; and program logic executed by the processing unit, comprising:

means for receiving a plurality of input quantization values;

means for receiving a block of quantized transformed data samples associated with the input quantization values, the block of quantized transformed data samples representing a block of original data samples;

means for selecting a table of constants capable of increasing the number of transformed data samples;

means for applying the plurality of input quantization values to the selected table of constants to produce a plurality of new constants; and means for applying the plurality of new constants to the block of quantized transformed data samples to produce at least two blocks of transformed data samples representing at least two blocks of final data samples.

22. A system for scaling up a number of data samples, comprising:

a processing unit capable of executing software routines; and program logic executed by the processing unit, comprising:

means for receiving a plurality of output quantization values;

means for receiving a block of transformed data samples representing a block of original data samples;

means for selecting a table of constants capable of increasing the number of transformed data samples;

means for applying the plurality of output quantization values to the selected table of constants to produce a plurality of new constants; and means for applying the plurality of new constants to the block of transformed data samples to produce at least two blocks of quantized transformed data samples associated with the output quantization values, the quantized transformed data samples representing at least two blocks of final data samples.

23. A system for scaling up a number of data samples, comprising:

a processing unit capable of executing software routines; and program logic executed by the processing unit, comprising:

means for receiving a plurality of input and output quantization values;

means for receiving a block of quantized transformed data samples associated with the input quantization values, the block of quantized transformed data samples representing a block of original data samples;

means for selecting a table of constants capable of increasing the number of transformed data samples by a different factor;

means for applying the plurality of input and output quantization values to the selected table of constants to produce a plurality of new constants; and means for applying the plurality of new constants to the block of quantized transformed data samples to produce at least two blocks of quantized transformed data samples associated with the output quantization values, the quantized transformed data samples representing at least two blocks of final data samples.

* * * * *